United States Patent [19]

Sekozawa et al.

[11] Patent Number: 4,964,051
[45] Date of Patent: Oct. 16, 1990

[54] SYSTEM AND METHOD FOR ELECTRONIC CONTROL OF INTERNAL COMBUSTION ENGINE

[75] Inventors: Teruji Sekozawa, Kawasaki; Makoto Shioya, Tokyo; Motohisa Funabashi, Sagamihara; Mikihiko Onari, Kokubunji, all of Japan

[73] Assignee: Hitachi, Ltd., Tokyo, Japan

[21] Appl. No.: 55,530

[22] Filed: May 29, 1987

[51] Int. Cl.$^5$ ............................................. B60K 31/00
[52] U.S. Cl. ........................... 364/431.04; 364/431.03; 123/492
[58] Field of Search ............... 123/492, 422, 423, 352, 123/399–401; 364/431.07, 431.05, 431.04, 431.03

[56] References Cited

U.S. PATENT DOCUMENTS

| | | | |
|---|---|---|---|
| 4,232,642 | 11/1980 | Yamaguchi et al. | 123/422 |
| 4,582,032 | 4/1986 | Hara et al. | 123/339 |
| 4,590,912 | 5/1986 | Atago | 123/492 X |
| 4,615,409 | 10/1986 | Küpper et al. | 123/352 X |
| 4,727,838 | 3/1988 | Oshiage et al. | 123/492 X |

FOREIGN PATENT DOCUMENTS

| | | |
|---|---|---|
| 2829894 | 1/1980 | Fed. Rep. of Germany . |
| 3341622 | 5/1984 | Fed. Rep. of Germany . |
| 2245501 | 4/1975 | France . |
| 2538855 | 10/1984 | France . |
| 2557041 | 6/1985 | France . |

OTHER PUBLICATIONS

Patent Abstracts of Japan, vol. 10, No. 265 (M-515) [2321], Sep. 10, 1986, 61-87976A (Toyota Motor Corp.) 06-05-1986; 1 page.
Patent Abstracts of Japan, vol. 7, No. 124 (M-218) [1269], May 28, 1983, 58-4124(A) (Mitsubishi Denki K.K.) 10-3-1983; 1 page.
Patent Abstracts of Japan, vol. 9, No. 333 (M-443) [2056], Dec. 27, 1985, 60-164631(A) (Fujisaki) 27-08-1985; 1 page.
Patent Abstracts of Japan, vol. 9, No. 333 (M-443) [2056], Dec. 27, 1985, 60-164629(A) (Nissan Jidosha K.K.) 27-08-1985; 1 page.
"Automobile Techniques", vol. 39, No. 9, 1985; pp. 1001–1005.
"Automotive Engineering", 6/82; p. 98.
Tabe et al—"On the Application of Modern Control Theory to Automotive Engine Control", IEEE IECON 1985; pp. 101–105.

Primary Examiner—Eugene R. Laroche
Assistant Examiner—Seung Ham
Attorney, Agent, or Firm—Antonelli, Terry, Stout & Kraus

[57] ABSTRACT

A system for electronically controlling an engine for a vehicle is disclosed which is of the kind electrically controlling the opening of a throttle valve controlling the quantity of intake air supplied to the engine. The electronic engine control includes setting a target acceleration of the vehicle according to an amount of depression of an accelerator pedal by the driver, comparing the target acceleration with an actual acceleration of the vehicle to find an error therebetween, setting a target value of the throttle valve opening on the basis of the acceleration error, and controlling the throttle valve opening until it attains the target value.

32 Claims, 13 Drawing Sheets

SYSTEM AND METHOD FOR ELECTRONIC CONTROL OF INTERNAL COMBUSTION ENGINE

BACKGROUND OF THE INVENTION

This invention relates to an electronic control system for an internal combustion engine, and more particularly to an electronic engine control system which improves quick responsiveness of engine torque to acceleration under various operating conditions of the engine.

First, various problems encountered hitherto at the time of acceleration of a vehicle equipped with an internal combustion engine will be discussed.

At the time of acceleration of such a vehicle, a delayed response to acceleration which is called a hesitation, a sudden output drop during acceleration which is called a stumble or sag, low frequency vibration in the longitudinal direction of the vehicle which is called an accelerating surge, etc. tend to occur and give the vehicle driver a feeling of discomfort.

Leanness of the air-fuel ratio in the air-fuel mixture supplied to the engine at the time immediately after acceleration is said to be a principal cause giving rise to these phenomena, and employment of a variable venturi type carburetor based on a method of independent fuel injection (sequential fuel injection) is reported in, for example, a magazine entitled "Automobile Techniques" Vol. 39, No. 9, pp. 1001-1005, 1985.

Also, a technique of electrically controlling the opening of a throttle valve according to the amount of depression of an accelerator pedal is reported in, for example, "Automotive Engineering", June 1982, p. 98 and "IEEE, IECON" 1985, pp. 101-105. However, improvements in the operation performance of an internal combustion engine during acceleration have not been considered much in these publications.

Thus, although the driver and other occupants of a vehicle feel that the vehicle is being accelerated only when the vehicle is driven in its advancing direction under acceleration, such acceleration has not been considered at all hitherto. (Acceleration in the advancing direction will be referred to hereinafter merely as acceleration.) That is, in spite of the fact that acceleration of the vehicle is an important factor which dominates the feeling of the vehicle driver and occupants as to whether they feel comfortable or not, the prior art proposals have not been satisfactory in that the will of the driver who intends to accelerate the vehicle is not immediately perceived and reflected, and the vehicle cannot be immediately accelerated. Therefore, it has been strongly demanded to achieve acceleration of a vehicle in response to the will of the vehicle driver, that is, actuation of an accelerator pedal thereby improving the acceleration performance, and to minimize occurrence of the phenomena including the accelerating surge thereby freeing the driver and occupants from the feeling of discomfort.

Next, ignition timing control by a prior art engine control system will be discussed. In the prior art system controlling an engine, the ignition timing is controlled according to various factors including the load of the engine, for example, the rotational speed of the engine and the quantity of intake air per suction stroke of the cylinder. The ignition timing is controlled under the condition that the opening of a throttle valve is in its steady state or constant. Therefore, in a transient state in which the throttle valve opening is continuously changing as when the vehicle is being accelerated or decelerated, proper ignition timing control cannot be attained, and the engine torque cannot quickly respond to the acceleration or deceleration. Thus, the prior art engine control system has been defective in that the vehicle cannot be quickly accelerated and decelerated.

Idling rotation speed control in the prior art engine control system will then be discussed. When, during idling of the engine, the rotational speed of the engine changes due to a load variation, an idling speed control valve (ISCV) or the throttle valve is actuated so as to restore the engine speed to its desired idling rotational speed. However, the prior art engine control system has been defective in that the engine torque cannot quickly respond to the load variation, and the engine speed is restored to the desired idling rotational speed with a considerable delay time.

SUMMARY OF THE INVENTION

It is a first object of the present invention to provide an electronic engine control system which improves quick responsiveness of engine torque to acceleration.

A second object of the present invention is to provide an electronic engine control system which can accelerate a vehicle according to an amount of depression of an accelerator pedal by the driver.

A third object of the present invention is to provide an electronic engine control system which can carry out optimized control of the ignition timing in both cases where the opening of a throttle valve is in its steady state and in its transient state, thereby improving quick responsiveness of the vehicle speed to actuation of the accelerator pedal.

A fourth object of the present invention is to provide an electronic engine control system which can quickly restore the rotational speed of the engine to the desired idling rotational speed even when the engine speed deviates from the desired idling rotational speed due to a load variation during idling.

In accordance with the present invention which attains the first and second objects described above, there is provided a system for electronically controlling an engine for a vehicle, which system is of the kind electrically controlling the opening of a throttle valve controlling the quantity of intake air supplied to the engine and is featured by the provision of means for setting a desired or target acceleration of the vehicle according to an amount of depression of an accelerator pedal by the vehicle driver, comparing the target acceleration with an actual acceleration of the vehicle to find a deviation or error therebetween, setting a desired or target value of the throttle valve opening on the basis of the acceleration error, and controlling the throttle valve opening until it attains the target value.

In accordance with the present invention which attains the first and third objects described above, there is provided an electronic engine control system which comprises means for computing a basic value of ignition timing advance corresponding to a load of the engine without considering the opening of the throttle valve, computing a required correction value of ignition timing advance corresponding to the load of the engine while taking into consideration the opening of the throttle valve, adding the correction value of ignition timing advance to the basic value of ignition timing advance, and applying an ignition signal representing the resultant value of ignition timing advance to an ignition system of the engine.

In accordance with the present invention which attains the first and fourth objects described above, there is provided an electronic engine control system in which, when the rotational speed of the engine varies during idling, not only the opening of an idling speed control valve (ISCV) but also the quantity of supplied fuel and the value of ignition timing advance are controlled, so that the engine rotational speed can be quickly restored to the desired idling rotational speed.

DESCRIPTION OF THE PREFERRED EMBODIMENTS

Figure 1:
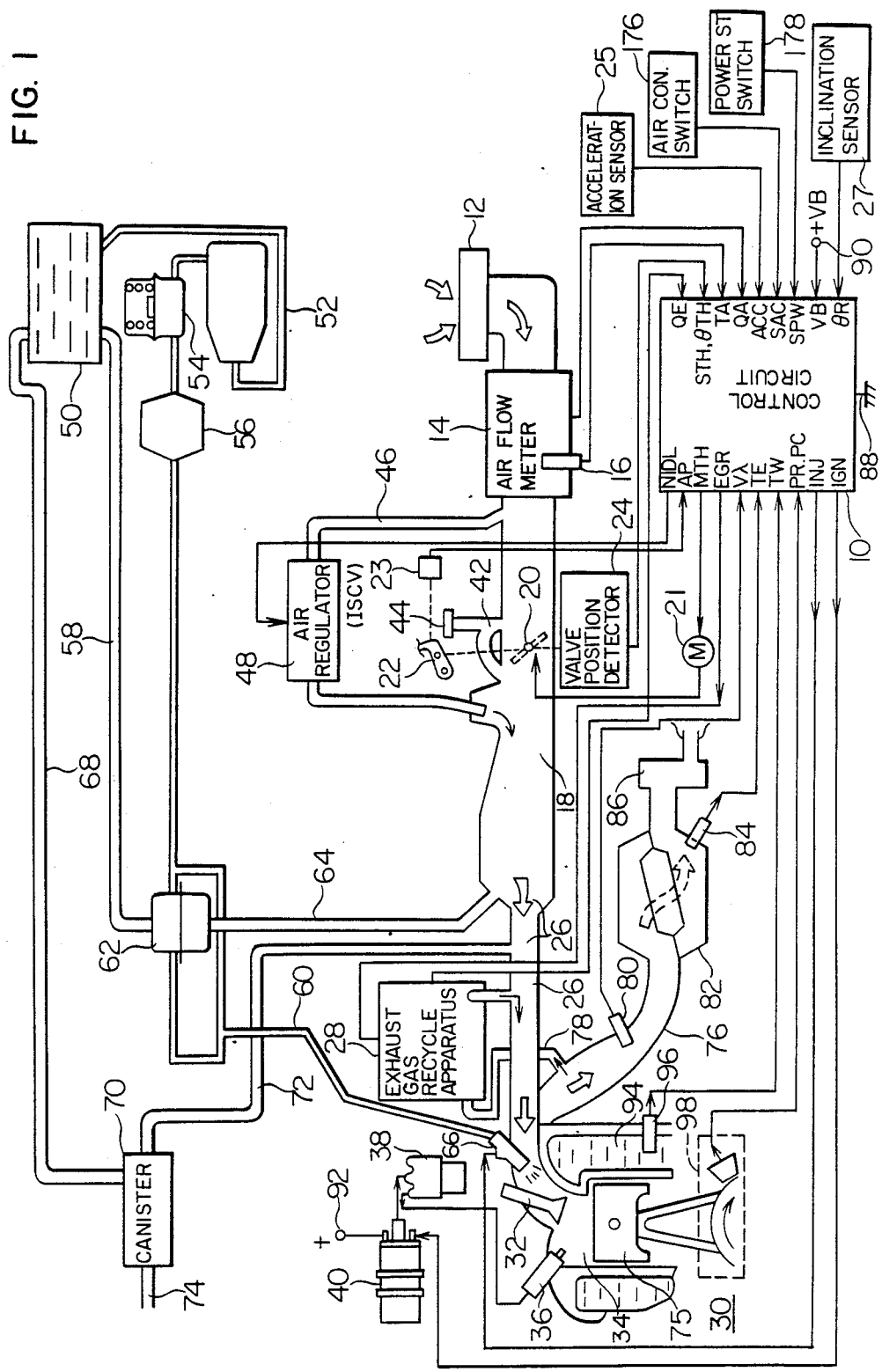
FIG. 1 is a diagrammatic view showing the structure of a typical example of an electronic engine control system to which the present invention is applied.

The electronic engine control system according to the present invention will now be described by way of embodiment with the aid of accompanying drawings. FIG. 1 systematically shows a typical example of the structure of an electronic engine control system according to the present invention. Air sucked through an air cleaner 12 is passed through an air flow meter 14 to measure the flow rate thereof, and the air flow meter 14 delivers an output signal QA indicating the flow rate of air to a control circuit 10. A temperature sensor 16 is provided in the air flow meter 14 so as to detect the temperature of the sucked air, and the output signal TA of the sensor 16, indicating the temperature of the sucked air, is also supplied to the control circuit 10.

The air flowing through the air flow meter 14 is further passed through a throttle chamber 18, an intake manifold 26 and a suction valve 32 to the combustion chamber 34 of an engine 30. The quantity of air inhaled into the combustion chamber 34 is controlled by changing the opening of a throttle valve 20 provided in the throttle chamber 18. The opening of the throttle valve 20 is detected by detecting the valve position of the throttle valve 20 by a throttle valve position detector 24, and a signal $\theta TH$ representing the valve position of the throttle valve 20 is supplied from the throttle valve position detector 24 to the control circuit 10. The position of an accelerator pedal 22 representing the amount of depression (angle) thereof is detected by an accelerator pedal position sensor 23 which in turn delivers a signal AP representing the position of the pedal 22 to the control circuit 10. The opening of the throttle valve 20 is controlled by a motor 21 (e.g. a step motor) which is driven by a signal MTH from the control circuit 10.

The throttle chamber 18 is provided with a bypass 42 for idling operation of the engine and an idle adjust screw 44 for adjusting the flow of air through the bypass 42. When the throttle valve 20 is completely closed, the engine operates in the idling condition. The sucked air from the air flow meter 14 flows via the bypass 42 and is inhaled into the combustion chamber 34. Accordingly, the flow of the air sucked under the idling condition is changed by adjusting the idle adjust screw 44. The energy created in the combustion chamber 34 is determined substantially depending on the flow rate of the air inhaled through the bypass 42 so that the rotation speed of the engine under the idling condition can be adjusted to an optimal one by controlling the flow rate of air inhaled into the combustion chamber 34 by adjusting the idle adjust screw 44.

The throttle chamber 18 is also provided with another bypass 46 and an air regulator 48 including an idle speed control valve (ISCV). The air regulator 48 controls the flow rate of the air through the bypass 46 in accordance with an output signal NIDL of the control circuit 10, so as to control the rotation speed of the engine during the warming-up operation and to properly supply air into the combustion chamber at a sudden change in, especially sudden closing of, the valve position of the throttle valve 20. The air regulator 48 can also change the flow rate of air during the idling operation.

Next, the fuel supply system will be described. Fuel stored in a fuel tank 50 is pumped out to a fuel damper 54 by means of a fuel pump 52. The fuel damper 54 absorbs the pressure undulation of the fuel supplied from the fuel pump 52 so that fuel having a constant pressure can be supplied through a fuel filter 56 to a fuel pressure regulator 62. The fuel fed past the fuel pressure regulator 62 is supplied under pressure to a fuel injector 66 through a fuel pipe 60, and an output signal INJ of the control circuit 10 causes the fuel injector 66 to inject the fuel into the intake manifold 26.

The quantity of the fuel injected by the fuel injector 66 is determined by the period for which the fuel injector 66 is opened and by the difference between the pressure of the fuel supplied to the injector and the pressure in the intake manifold 26 in which the pressurized fuel is injected. It is however preferable that the quantity of the injected fuel should depend only on the period for which the injector is opened and which is determined by the signal supplied from the control circuit 10. Accordingly, the pressure of the fuel supplied by the fuel pressure regulator 62 to the fuel injector 66 is controlled in such a manner that the difference between the pressure of the fuel supplied to the fuel injector 66 and the pressure in the intake manifold 26 is kept always constant in any driving condition. The pressure in the intake manifold 26 is applied to the fuel pressure regulator 62 through a pressure conducting pipe 64. When the pressure of the fuel in the fuel pipe 60 exceeds the pressure setting of the regulator 62 by a predetermined level, the fuel pipe 60 communicates with a fuel return pipe 58 so that the excessive fuel corresponding to the excessive pressure is returned through the fuel return pipe 58 to the fuel tank 50. Thus, the difference between the pressure of the fuel in the fuel pipe 60 and the pressure in the intake manifold 26 is kept always constant.

The fuel tank 50 is also provided with a pipe 68 connected to a canister 70 provided for the suction of atomized fuel or fuel gas. When the engine is operating, air is sucked through an open air inlet 74 to supply the fuel gas into the intake manifold 26 and therefore into the engine 30 via a pipe 72. When the engine is stopped, the fuel gas is exhausted through activated carbon filled in the canister 70.

As described above, the fuel is injected by the fuel injector 66, the suction valve 32 is opened in synchronism with the motion of a piston 75, and a gaseous mixture of air and fuel is sucked into the combustion chamber 34. The mixture is compressed and fired by the spark generated by an ignition plug 36 so that the energy created through the combustion of the mixture is converted to mechanical energy.

The exhaust gas produced as a result of the combustion of the gaseous mixture is discharged into the open air through an exhaust valve (not shown), an exhaust pipe 76, a catalytic converter 82 and a muffler 86. The exhaust pipe 76 is provided with an exhaust gas recycle pipe 78 (hereafter referred to for short as an EGR pipe), through which part of the exhaust gas is guided into the intake manifold 26, that is, part of the exhaust gas is circulated to the suction side of the engine. The quantity of the circulated exhaust gas is determined depending on the opening of the valve of an exhaust gas recycle apparatus 28. The valve opening is controlled by an output signal EGR of the control circuit 10, and the valve position of the apparatus 28 is converted into an electric signal QE to be supplied as an input to the control circuit 10.

A λ sensor 80 is provided in the EGR pipe 78 to detect the fuel-air mixture ratio of the mixture gas sucked into the combustion chamber 34. An oxygen sensor ($O_2$ sensor) is usually used as the λ sensor 80 and detects the concentration of oxygen contained in the exhaust gas so as to generate a voltage signal $V_\lambda$ corresponding to the concentration of the oxygen contained in the exhaust gas. The output signal $V_\lambda$ of the λ sensor 80 is supplied to the control circuit 10. The catalytic converter 82 is provided with a temperature sensor 84 for detecting the temperature of the exhaust gas in the converter 82, and the output signal TE of the sensor 84 corresponding to the temperature of the exhaust gas in the converter 82 is supplied to the control circuit 10.

The control circuit 10 has a negative power source terminal 88 and a positive power source terminal 90. The control circuit 10 supplies the signal IGN, for causing the ignition plug 36 to spark, to the primary winding of an ignition coil 40. As a result, a high voltage is induced in the secondary winding of the ignition coil 40 and supplied through a distributor 38 to the ignition plug 36 so that the plug 36 fires to cause the combustion of the gaseous mixture in the combustion chamber 34. The mechanism for firing the ignition plug 36 will be further detailed. The ignition plug 36 has a positive power source terminal 92, and the control circuit 10 also has a power transistor for controlling the primary current through the primary winding of the ignition coil 40. The series circuit of the primary winding of the ignition coil 40 and the power transistor is connected between the positive power source terminal 92 of the ignition coil 40 and the negative power source terminal 88 of the control circuit 10. When the power transistor is conducting, electromagnetic energy is stored in the ignition coil 40, and when the power transistor is cut off, the stored electromagnetic energy is released as a high voltage to the ignition plug 36.

The engine 30 is provided with a temperature sensor 96 for detecting the temperature of the water 94 circulated as a collant in the water jacket, and the temperature sensor 96 delivers to the control circuit 10 a signal TW representing the temperature of the water 94. The engine 30 is further provided with an angular position sensor 98 for detecting the angular position of the rotary shaft of the engine, and the sensor 98 generates a reference signal PR in synchronism with the rotation of the engine, e.g. every 120° of the rotation, and an angular position signal PC each time the engine rotates through a constant, predetermined angle (e.g. 0.5°). The reference signal PR and the angular position signal PC are both supplied to the control circuit 10.

An acceleration sensor 25 detects the acceleration of the vehicle and delivers a signal Acc representing the value of acceleration to the control circuit 10. The sensor 25 may be one which detects the inclination of the vehicle body. An air conditioner switch 176 delivers a signal SAC indicating the ON state of an air conditioner to the control circuit 10. A power steering switch 178 delivers a signal SPW indicating the ON state of a power steering stystem (not shown) to the control circuit 10. An inclination sensor 27 delivers a signal AR indicating an inclination of the road to the control circuit 10.

Figure 2:
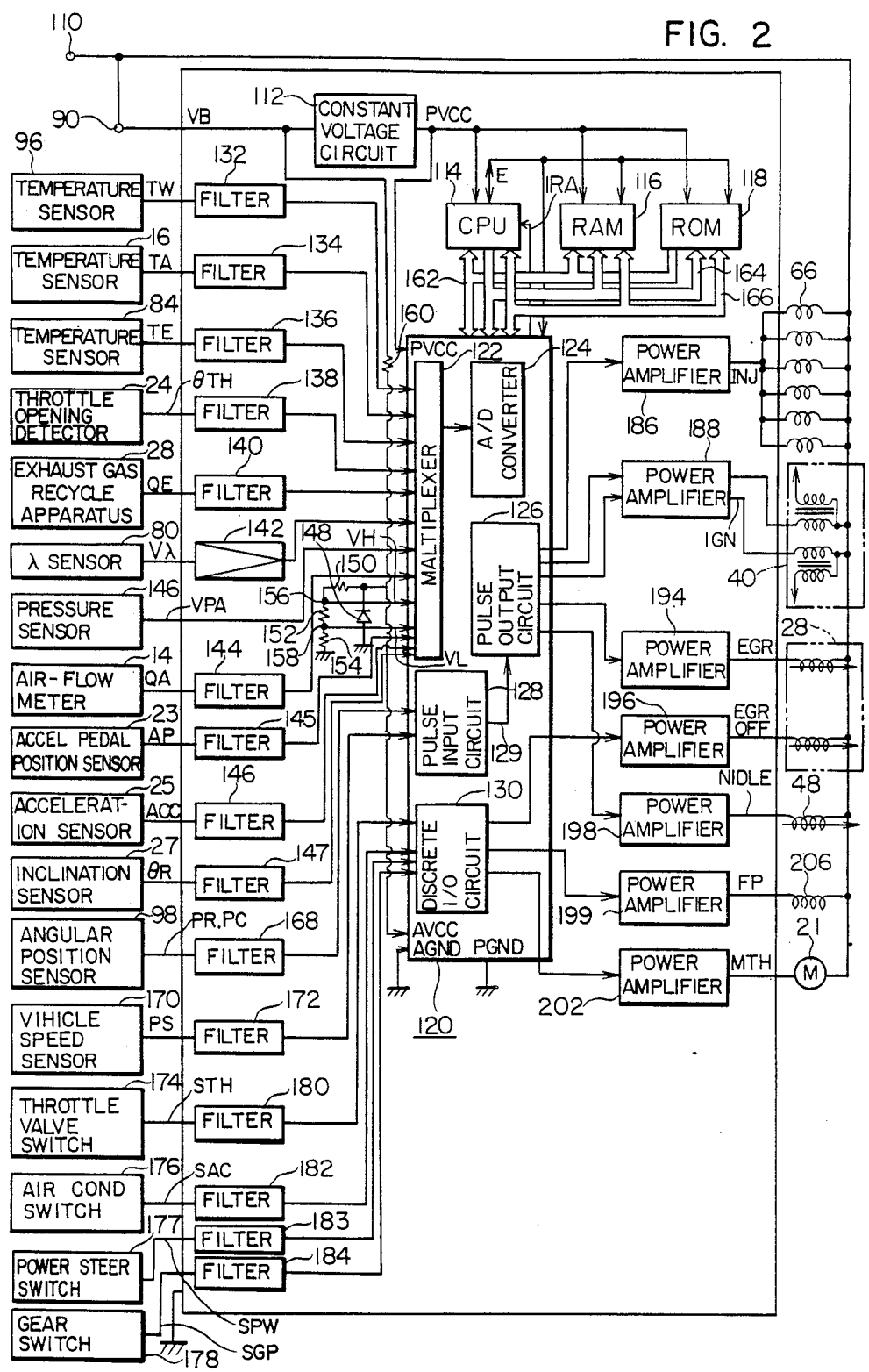
FIG. 2 shows in detail the structure of the control circuit shown in FIG. 1.

FIG. 2 shows in detail the structure of the control circuit 10 shown in FIG. 1. The positive power source terminal 90 of the control circuit 10 is connected with the positive electrode 110 of a battery to provide a voltage VB for the control circuit 10. The power source voltage VB is adjusted to a constant voltage PVCC of, for example, 5 volts by a constant voltage circuit 112. This constant voltage PVCC is applied to a central processor unit 114 (hereafter referred to as a CPU), a random access memory 116 (hereafter referred to as a RAM) and a read-only memory 118 (hereafter referred to as a ROM). The output voltage PVCC of the constant voltage circuit 112 is supplied also to an input/output circuit 120.

The input/output circuit 120 includes therein a multiplexer 122, an analog-digital converter 124, a pulse output circuit 125, a pulse input circuit 128 and a discrete input/output circuit 130.

The multiplexer 122 receives plural analog signals, selects one of the anlog signals in accordance with the instruction from the CPU, and applies the selected signal to the A/D converter 124. The analog signal inputs applied through filters 132 to 147 to the multiplexer 122 are the outputs of the various sensors shown in FIG. 1; the analog signal TW from the sensor 96 representing the temperature of the cooling water in the water jacket of the engine, the anlog signal TA from the sensor 16 representing the temperature of the sucked air, the analog signal TE from the sensor 84 representing the temperature of the exhaust gas, the analog signal θTH from the throttle opening detector 24 representing the opening of the throttle valve 20, the analog signal QE from the exhaust recycle apparatus 28 representing the opening of the valve of the apparatus 28, the analog signal $V_\lambda$ from the λ sensor 80 representing the air-excess rate of the sucked mixture of fuel and air, the analog signal QA from the air flow meter 14 representing the flow rate of air, the analog signal AP from the accelerator pedal position sensor 23 representing the depression angle of the accelerator pedal, the analog signal Acc from the acceleration sensor 25 representing the acceleration of the vehicle, and the anlog signal θR from the inclination sensor 27 representing the inclination of the road. The output signal $V_\lambda$ of the λ sensor 80 described above is supplied through an amplifier 142 with a filter circuit to the multiplexer 122.

An analog signal VPA from an atmospheric pressure sensor 146 representing the atmospheric pressure is also supplied to the multiplexer 122. The voltage VB is applied from the positive power source terminal 90 to a series circuit of resistors 150, 152 and 154 through a resistor 160. The series circuit of the resistors 150, 152 and 154 is shunt with a Zener diode 148 to keep the voltage across it constant. To the multiplexer 122 are applied the voltages VH and VL at the junction points 156 and 158 respectively between the resistors 150 and 152 and between the resistors 152 and 154.

The CPU 114, the RAM 116, the ROM 118 and the input/output circuit 120 are interconnected respectively by a data bus 162, an address bus 164 and a control bus 166. A clock signal E is supplied from the CPU to the RAM, ROM and input/output circuit 120, and the data transfer takes place through the data bus 162 in timing with the clock signal E.

The multiplexer 122 in the input/output circuit 120 receives as its analog inputs the signals representing the cooling water temperature TW, the temperature TA of the sucked air, the temperature TE of the exhaust gas, the throttle valve opening θTH, the quantity QE of recycle exhaust gas, the output $V_\lambda$ of the λ sensor, the atmospheric pressure VPA, the quantity QA of the sucked air, the quantity AP of the accelerator position, the quantity Acc of the acceleration and the reference voltages VH and VL. The CPU 114 specifies the address of each of these analog inputs through the address bus 164 in accordance with the instruction program stored in the ROM 118, and the analog input having a specified address is taken in. The analog input taken in is applied through the multiplexer 122 to the analog/digital converter 124, and the output of the converter 124, i.e. the A/D converted value, is held in the associated register. The stored value is supplied, if desired, to the CPU 114 or RAM 116 in response to the instruction sent from the CPU 114 through the control bus 166.

The pulse input circuit 128 receives as inputs the reference pulse signal PR and the angular position signal PC both in the form of a pulse train from the angular position sensor 98 through a filter 168. A pulse train of pulses PS having a repetition frequency corresponding to the speed of the vehicle is supplied from a vehicle speed sensor 170 to the pulse input circuit 128 through a filter 172. The signals processed by the CPU 114 are held in the pulse output circuit 126. The output of the pulse output circuit 126 is applied to a power amplifying circuit 186, and the fuel injector 66 is controlled by the output signal of the power amplifying circuit 186.

Power amplifying circuits 188, 194 and 198 respectively control the primary current of the ignition coil 40, the valve opening of the exhaust recycle apparatus 28 and the valve opening of the air regulator 48 in accordance with the output pulses of the pulse output circuit 126. The discrete input/output circuit 130 receives a signal STH from a throttle valve switch 174 indicating the completely closed state of the throttle valve 20, a signal SAC from the air conditioner switch 176, a signal SPW from the power steering switch 177 and a signal SGP from a gear switch 178 indicating the transmission gear position, respectively through filters 180, 182, 183 and 184 and holds the signals. The discrete input/output circuit 130 also receives and holds the processed signals from the CPU 114. The discrete input/output circuit 130 processes the signals the content of each of which can be represented by a single bit. In response to the signal from the CPU 114, the discrete input/output circuit 130 applies signals to the power amplifying circuits 196, 199 and 202 so that the exhaust recycle apparatus 28 is closed to stop the recycle of exhaust gas, the fuel pump is controlled, and the motor 21 for moving the throttle valve 20 is driven.

The inclination of the vehicle body may be detected by differentiating the signal PS from the vehicle speed sensor 170, without using the acceleration sensor 25.

A first embodiment of the present invention adapted to compute the acceleration of the vehicle on the basis of the amount of depression of the accelerator pedal by the driver will be described in detail with reference to FIGS. 1 to 6.

Figure 3:
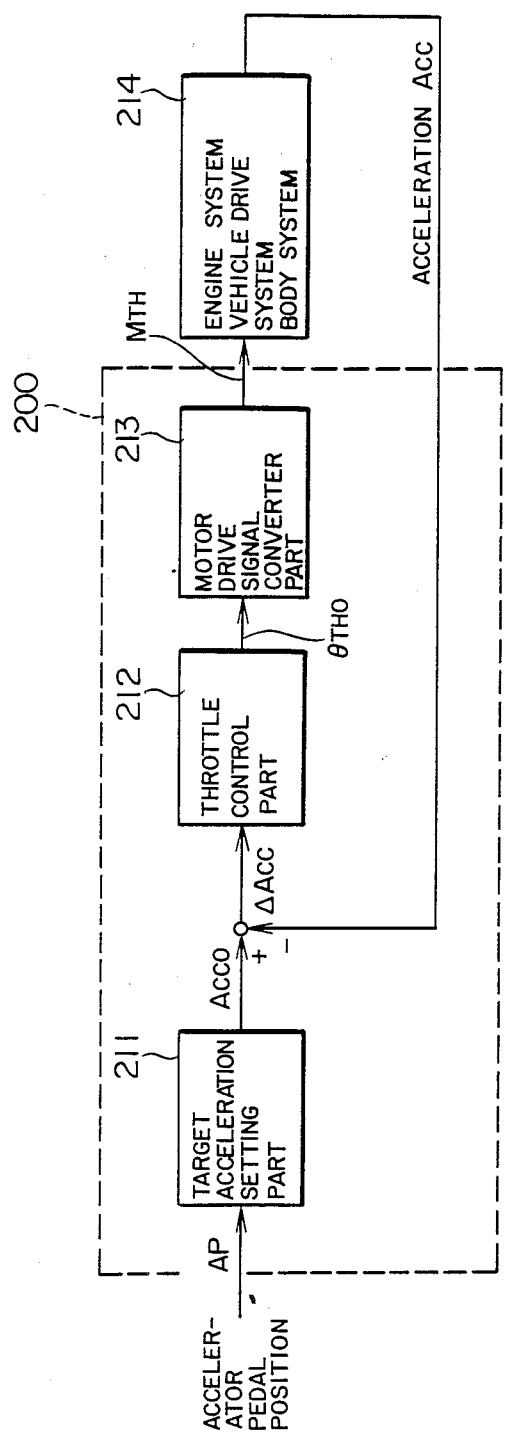
FIG. 3 is a block diagram showing principal parts of a first embodiment of the present invention.

FIG. 3 shows principal parts of the first embodiment. Referring to FIG. 3, the first embodiment comprises an arithmetic and logic control unit 200 which includes a desired or target acceleration setting part 211, a throttle control part 212, and a motor drive signal converter part 213 and which is connected to hardware parts 214 including the engine system, vehicle drive system, suspension system and body system. The arithmetic and logic control unit 200 corresponds to the control circuit 10 which is shown in FIG. 1 and which has the structure shown in FIG. 2. In FIG. 3, the functions of the control circuit 10 are represented by the blocks 211, 212 and 213. In lieu of the control circuit 10 shown in FIG. 2, the functions of the blocks 211 to 213 may be provided by a wired logic arrangement.

The arithmetic and logic control unit 200 receives the signal AP applied from the accelerator pedal position sensor 23 and representing the angle of depression of the accelerator pedal 22. (The angle is 0° when the acclerator pedal is not depressed.) The arithmetic and logic control unit 200 receives also the signal Acc applied from the acceleration sensor 25 and representing the acceleration of the vehicle. On the basis of these input signals, the arithmetic and logic control unit 200 computes the desired or target value of the opening of the throttle valve 20, and this target throttle valve opening signal is converted by the motor drive signal converter part 213 into a corresponding motor drive signal $M_{TH}$ for driving the motor 21. Thus, by setting the throttle valve opening at the target value, the vehicle is run with the desired acceleration.

That is, the blocks 211, 212 and 213 correspond to the CPU 114, ROM 118 and RAM 116 shown in FIG. 2, and the motor drive signal $M_{TH}$ is set in the discrete I/O circuit 130 to be applied to the motor 21 through the amplifier 202.

The target acceleration setting part 211 receives the accelerator pedal position signal AP as its input and, on the basis of the value of this signal AP, determines a target value Acco of vehicle acceleration desired by the vehicle driver. The throttle control part 212 receives a signal representing a deviation or error ΔAcc of a signal representing an actual acceleration Acc of the vehicle from the target acceleration signal Acco as its input, and determines a target value θTHO of the throttle valve opening by a control gain adjusting element, a phase lead element or a phase lag element or their combination. (In this first embodiment of the present invention, the target value θTHO of the throttle valve opening is determined by serial compensation by the combination of the elements described above.) The signal θTHO representing the target value of the throttle valve opening is converted by the motor drive signal converter part 213 into the motor drive signal $M_{TH}$ which is applied to the motor 21.

Figure 4:
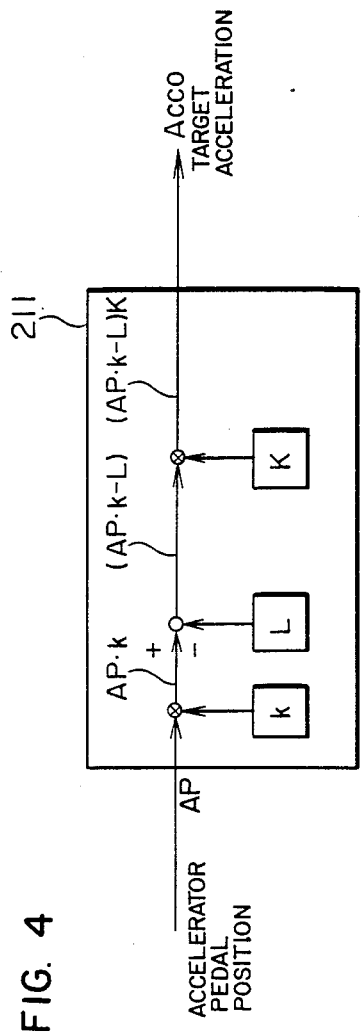
FIG. 4 shows the structure of the target acceleration setting part shown in FIG. 3.

FIG. 4 shows the structure of the target acceleration setting part 211 shown in FIG. 3. In the target acceleration setting part 211, the accelerator pedal position signal AP is multiplied by a predetermined coefficient k to compute the drive force AP·k required by the driver. Then, the load L of the engine is subtracted from the drive force AP·k to compute the target value (AP·k−L) of the drive force to be used for actual acceleration or deceleration of the vehicle. The following relation holds:

$$L = R_l + R_a + R_r = \mu_r W + C_p \cdot S \cdot V_a^2 + W \sin\theta r \quad (1)$$

where
$R_0$: Rolling resistance of vehicle
$R_1$: Air resistance of vehicle
$R_r$: Grade resistance of vehicle
$\mu_r$: Coefficient of rolling resistance
W: Weight of vehicle
$C_D$: Coefficient of air resistance
Va: Speed of vehicle
θr: Gradient or inclination of road
The factors $\mu_l$, $C_D$ and W are predetermined depending on the vehicle, and such values are previously stored in the ROM 118 or RAM 116. The vehicle speed Va is obtained from the output signal PS of the vehicle speed sensor 174, and the inclination θr of the road is obtained from the output signal $\theta_R$ of the inclination sensor 27.

Then, the target value of vehicle drive force (AP·k−L) is multiplied by a predetermined coefficient K to compute the target acceleration Acco. Here, the value of the coefficient K is given by $$K = \frac{g}{W + D_W} \quad (2)$$

where
g: Acceleration of gravity
$D_W$: Rotation-equivalent weight determined by gear ratio
W: Weight of vehicle
In the above equation (2), $D_W$ is expressed as follows:

$$D_W = 0.04 \times (\text{gear ratio})^2 \times W$$

The gear ratio is identified by the output signal SGP of the gear switch 178.

The target acceleration Acco computed in the manner described above is compared with the measured value Acc of the acceleration of the vehicle to compute the error ΔAcc=Acco−Acc, and the error signal ΔAcc is applied to the throttle control part 212.

Figure 5:
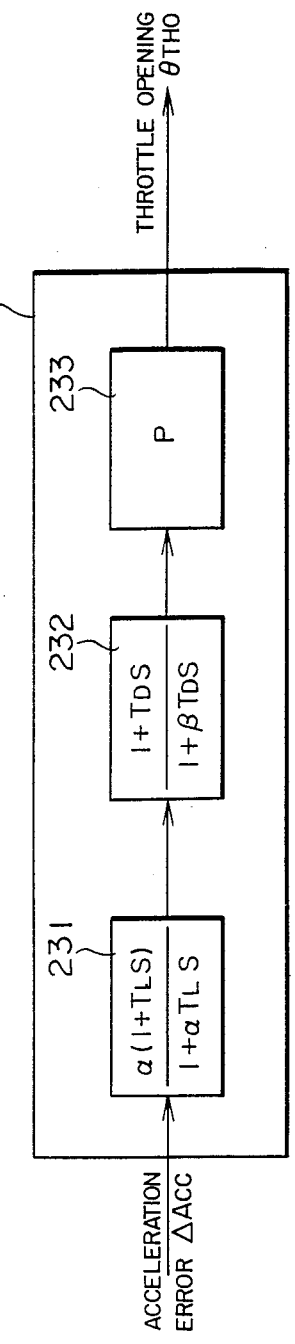
FIG. 5 shows the structure of the throttle control part shown in FIG. 3.

FIG. 5 shows the structure of the throttle control part 212, and Laplace transformation of functions of time is expressed in the form of transfer functions. Referring to FIG. 5, the throttle control part 212 includes a phase lead element 231, a phase lag element 232 and a gain adjusting element 233.

In the phase lead element 231, its transfer function $G_L$ is given by $$G_L = \frac{\alpha(1 + T_L S)}{1 + \alpha T_L S} \quad (3)$$

where $0 < \alpha < 1$.

This phase lead element 231 is such that the phase of its output signal leads that of its input signal. That is, this phase lead element 231 acts to advance the phase of its output signal relative to that of its input signal at a frequency w in the vicinity of $$\frac{1}{T_L \sqrt{\alpha}},$$

thereby improving quick responsiveness of the acceleration to depression of the accelerator pedal. When a quick acceleration of the vehicle is intended, the unit time of changing the angular position of the accelerator pedal is several-ten msec. Since the frequency is higher than that generating an accelerating surge, the value of $T_L$ must be determined while taking such a matter into account. Herein, the value of $T_L$ is selected to be a period of time (several hundred msec to 1 sec) required until the acceleration attains about 63% of the target value after the throttle valve is abruptly opened.

The transfer function $G_D$ of the phase lag element 232 is given by $$G_D = \frac{1 + T_D S}{1 + \beta T_D S} \quad (4)$$

The value of β in the equation (4) is determined so that 1/β of the error of acceleration of the vehicle lies within a range of required accuracy. The error of acceleration of the vehicle refers to an error that may exist infinitely between an actual acceleration of the vehicle and a target acceleration which is similar to a ramp input increasing stepwise by a constant amount. This phase lag element 232 is provided for improving the control information and acts to delay the phase of its input signal at a frequency such as that of an accelerating surge belonging to a relatively low frequency range. That is, in the vehicle drive system having a natural frequency causing an accelerating surge, the phase only of its input signal is caused to lag without changing the gain in a low frequency range lower than the natural frequency (10 Hz), thereby preventing occurrence of an undesirable accelerating surge. In the above function, $T_D$ is determined as follows:

$$(\text{Surge frequency}) = 1/T_D \quad (5)$$

This surge frequency differs depending on the vehicle and is the frequency of torsional vibration of the crank shaft of the engine.

The gain adjusting element 233 has a gain P so as to adjust the gain lowered by α of the phase lead element 231 and β of the phase lag element 232 and to improve the stability of operation. Therefore, the gain adjusting element 233 generates an output signal representing the desired or target value $\theta_{THO}$ of the throttle valve opening, and this signal $\theta_{THO}$ is converted by the motor drive signal converter part 213 into the motor drive signal $M_{TH}$ which is applied to the motor 21.

Figure 6:
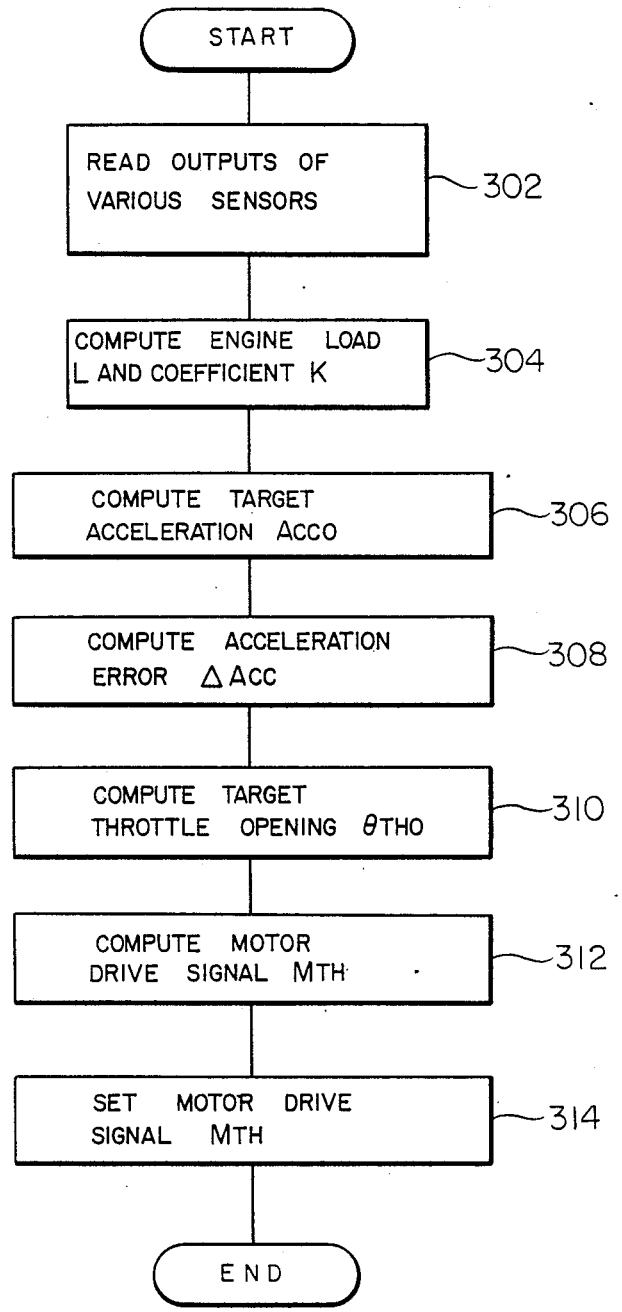
FIG. 6 is a flow chart showing the operation of the first embodiment of the present invention.

The operation of the first embodiment of the present invention will be described with reference to a flow chart of FIG. 6. The sequence of steps shown in FIG. 6 is executed at an interval of a predetermined period of time according to a program stored in the ROM 118 shown in FIG. 2.

In a first step 302, the control circuit 10 fetches output signals AP, Acc, PS, $\theta_R$ and SGP from various sensors including the accelerator pedal position sensor 23, acceleration sensor 25, vehicle speed sensor 170, inclination sensor 27 and gear switch 178 and stores the data in the RAM 116.

In a step 304, the values of $\mu_l$, W and $C_D$ previously stored in the RAM 116 and the values of the vehicle speed Va and road inclination $\theta_R$ fetched in the step 302 are substituted in the equation (1) to compute the load L of the engine. Further, on the basis of the gear ratio obtained from the output signal SGP of the gear switch 178, the coefficient K is computed according to the equation (2).

Then, in a step 306, the accelerator pedal position signal AP fetched in the step 302 is multiplied by a predetermined coefficient k stored in the RAM 116 to compute AP·k, and, using the values of L and K computed in the step 304, the target acceleration Acco=−(AP·k−L)K is computed.

In a step 308, the measured value of the acceleration Acc of the vehicle stored in the RAM 116 is subtracted from the target acceleration Acco to compute the acceleration error ΔAcc.

In a step 310, the following computation is made on the basis of the computed acceleration error ΔAcc to compute the target value $\theta_{THO}$ of the throttle valve opening:

$$\frac{\alpha(1 + T_L S)}{1 + \alpha T_L S} \cdot \frac{1 + T_D S}{1 + \beta T_D S} \cdot P$$

In a step 312, the target value $\theta_{THO}$ of the throttle valve opening is converted into the motor drive signal $M_{TH}$, and, in a step 314, this motor drive signal $M_{TH}$ is stored in the discrete I/O circuit 130.

The motor drive signal $M_{TH}$ stored in the discrete I/O circuit 130 is applied through the power amplifier 202 to the motor 21 to set the throttle valve opening at the target value $\theta_{THO}$ thereby achieving the desired acceleration Acco.

It will be seen from the above description that the method of electronic engine control in the first embodiment of the present invention comprises setting a target acceleration of the vehicle according to the amount of depression of the accelerator pedal by the driver, comparing the actually detected value of the acceleration of the vehicle with the target value of the acceleration to find any error therebetween, and computing a target value of the throttle valve opening on the basis of the acceleration error. Thus, the vehicle can be accelerated according to the will of the driver, so that the driver will not feel uncomfortable during acceleration.

In the throttle control part 212, the acceleration error signal is subjected to the phase lead, phase lag and gain adjustment to compute the target value of the throttle valve opening. Therefore, an undesirable hesitation and stumble during acceleration can be decreased thereby improving quick responsiveness of the acceleration to the actuation of the accelerator pedal and minimizing an undesirable accelerating surge.

A second embodiment of the present invention will be described with reference to FIGS. 7 to 9.

In this second embodiment, the ignition timing is controlled to be optimum for both a steady state and a transient state of the opening of the throttle valve so that the vehicle speed can quickly respond to the actuation of the accelerator pedal.

In the electronic engine control system shown in FIG. 1, there occurs inevitably a delay time until the engine torque is changed under control of the fuel control system and ignition control system in response to a change in the opening of the throttle valve. This delay will be explained with reference to FIG. 9.

Figure 9:
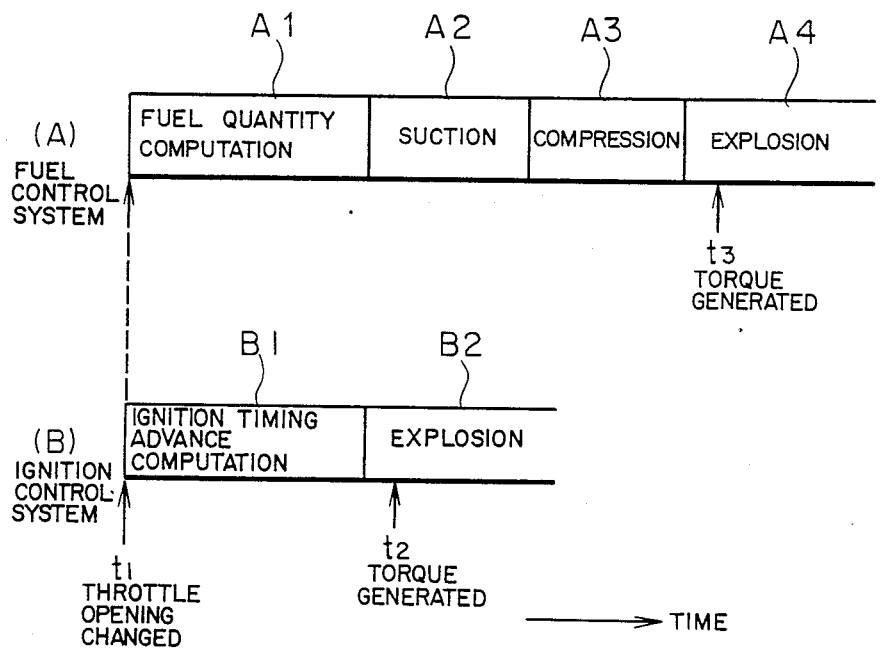
FIG. 9 shows how generation of engine torque is delayed in the case of control by a fuel control system relative to the case of control by an ignition control system.

The operation of the fuel control system is shown in (A) of FIG. 9. When now the throttle valve opening is changed at time $t_1$, the quantity of intake air changes correspondingly. This quantity of intake air is measured in a period A1, and the quantity of fuel which provides a pre-set air-fuel ratio is computed and injected. A period A2 corresponds to a suction stroke in which the mixture of intake air and injected fuel is sucked into the cylinder. A period A3 corresponds to the compression stroke in which the air-fuel mixture is compressed, and a period A4 corresponds to the explosion stroke in which the compressed air-fuel mixture is ignited. The engine torque changes at time $t_3$ in the period A4. Thus, the engine torque changes after the periods A1, A2 and A3 have elapsed from time $t_1$ at which the throttle valve opening was changed.

The operation of the ignition control system is shown in (B) of FIG. 9. When the throttle valve opening is changed at time $t_1$, the quantity of intake air changes correspondingly. In a period B1, the amount of ignition timing advance required to deal with the change in the quantity of intake air is computed, and in a period B2, the air-fuel mixture is ignited in the corresponding cylinder according to the computed ignition timing advance, thereby changing the engine torque at time $t_2$. Thus, the ignition control system can respond to a change in the throttle valve opening more quickly or by about two strokes earlier than the fuel control system, so that the delayed response of the fuel control system can be compensated. The fuel control system may be of a fuel injection type or a carburetor type.

Therefore, the engine control system may be designed so that, when the vehicle is being accelerated or decelerated, that is, when the throttle valve opening is changing, the fuel control system and ignition control system are controlled on the basis of the quantity of intake air changing according to the change in the throttle valve opening, thereby improving the responsiveness of the vehicle speed to a change in the throttle valve opening. The solid curve shown in (B) of FIG. 8 represents the vehicle speed controlled as a function of the throttle valve opening changing as shown in (A) of FIG. 8. It will be apparent from FIG. 8 that the responsiveness of the vehicle speed to the amount of depression of the accelerator pedal is not satisfactory.

In the second embodiment of the present invention, therefore, the ignition timing is controlled not only according to the quantity of intake air but also according to a change in the throttle valve opening, which change indicates that the throttle valve opening is in its transient state.

Figure 7:
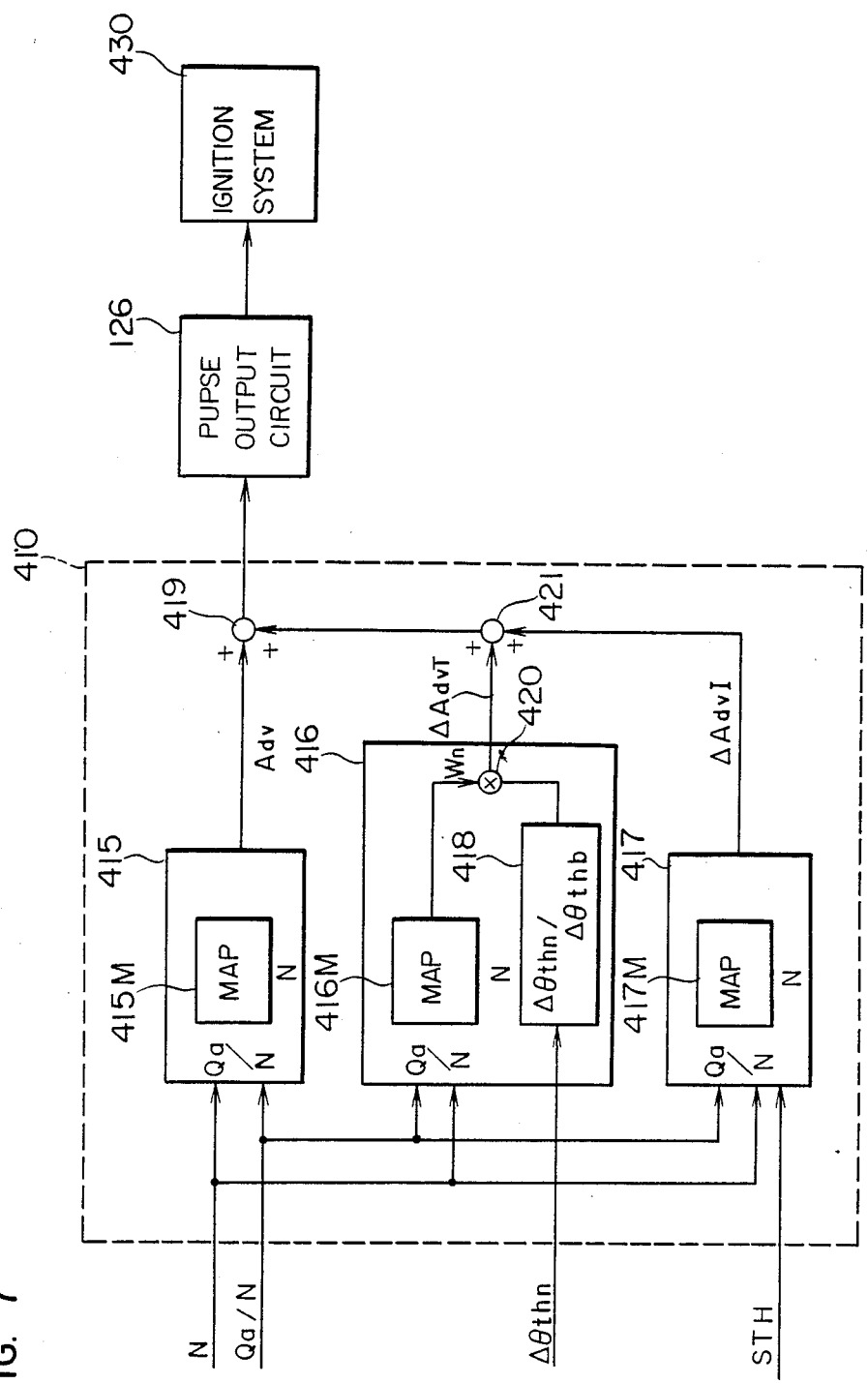
FIG. 7 is a block diagram showing principal parts of a second embodiment of the present invention.
Figure 8:
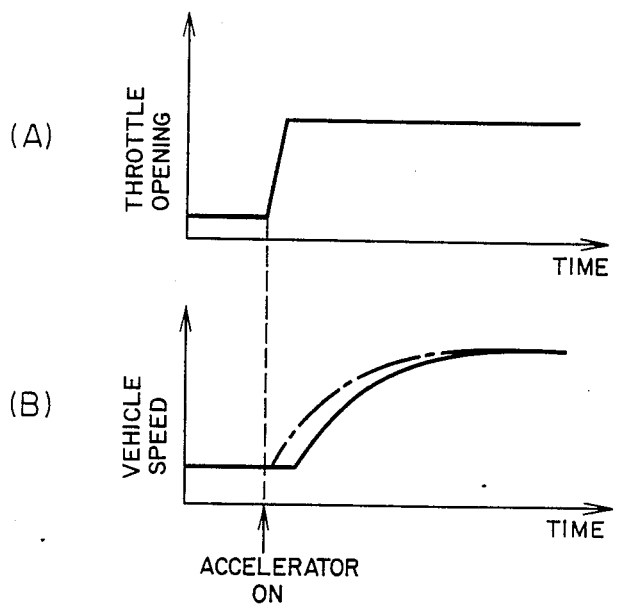
FIG. 8 shows how the opening of the throttle valve and the speed of the vehicle change relative to time according to the second embodiment of the present invention.

FIG. 7 shows principal parts of the second embodiment of the present invention.

Referring to FIG. 7, an arithmetic and logic control unit 410 includes an ignition control part 415 commonly used hitherto, a first ignition timing advance correcting part 416 correcting the amount of ignition timing advance according to a change in the throttle valve opening, and a second ignition timing advance correcting part 417 correcting the amount of ignition timing advance in response to an output signal of a throttle valve switch described later. The arithmetic and logic control unit 410 corresponds to the combination of the CPU 114, ROM 118 and RAM 116 in the control circuit 10 shown in FIG. 2, and its functions are represented by the blocks. However, the arithmetic and logic control unit 410 may be provided by a wired logic arrangement.

The arithmetic and logic control unit 410 is connected at its output to an ignition system 430 (the combination of the power amplifier 188 and the ignition coil 40 shown in FIG. 2) through the pulse output circuit 126 shown in FIG. 2. This second embodiment is applied also to the engine control system shown in FIGS. 1 and 2, and its fuel control system may be any of a fuel injection type and a carburetor type. Further, although the throttle valve 20 may be of the type driven by the motor 21, the throttle valve 20 in this embodiment is of the type mechanically interlocked with the accelerator pedal 22.

In the conventional ignition control part 415 shown in FIG. 7, a basic value of ignition timing advance Adv is determined by retrieval of a map 415M of basic values as a function of, for example, the engine rotational speed N and the load Qa/N (where Qa is the quantity of intake air). In addition to the conventional ignition control part 415, the two ignition timing advance correcting parts 416 and 417 are provided in the arithmetic and logic control unit 410 of the second embodiment.

Inputs to the first ignition timing advance correcting part 416 are a signal $\Delta\theta_{TH}$ representing an amount of change in the throttle valve opening resulting from depression of the accelerator pedal by the driver, a signal representing the engine rotation speed N and a signal representing the load Qa/N, and an output signal representing an ignition timing advance correcting value $\Delta AdvT$ is generated from the correcting part 416. The first ignition timing advance correcting part 416 also includes a map 416M of correcting values Wn as a function of the engine rotation speed N and the load Qa/N, and such values Wn are previously determined each of which represents a unit correction angle indicating a reference amount of correcting the ignition timing advance when a predetermined change $\Delta\theta$thb in the throttle valve opening occurs per unit time $\Delta T$. That is, $\Delta\theta$thb is a reference value of change in the throttle valve opening, and the map 416M is based on the above reference value $\Delta\theta$thb. Therefore, when the ratio $\Delta\theta$thn/$\Delta\theta$thb between the value of actual change $\Delta\theta$thn in the throttle valve opening per unit time $\Delta T$ and the reference value $\Delta\theta$thb is computed by a divider 418, and the unit correction angle Wn is multiplied by the above ratio $\Delta\theta$thn/$\Delta\theta$thb by a multiplier 420, the ignition timing advance correcting value $\Delta AdvT$ can be obtained.

Suppose, for example, that the throttle valve opening $\theta_{TH}$ changes by $\Delta\theta$thn from time $t_{n-1}$ to time $T_n$ which is later than the time $t_{n-1}$ by a unit time $\Delta T$, and the engine rotational speed and engine load at that time are Nn and (Qa/N)n respectively. Under the above condition, the unit correction angle Wn corresponding to Nn and (Qa/N)n is retrieved from the map 416M of N and (Qa/N) and is multiplied by the above ratio $\Delta\theta$thn/$\Delta\theta$thb by the multiplier 420 to compute the ignition timing advance correcting value $\Delta AdvT$ as follows:

$$\Delta AdvT = Wn \frac{\Delta\theta thn}{\Delta\theta thb} \quad (6)$$

The map 416M may be a three-dimensional map of $\Delta\theta$thn, N and Qa/N.

An output signal $S_{TH}$ of the throttle valve TH switch 174 shown in FIG. 2 is applied as an input to the second ignition timing advance correcting part 417. This input signal $S_{TH}$ is in its on state when the throttle valve 20 is completely closed, but is is in its off state in the other cases. An output signal representing an ignition timing advance correcting value $\Delta AdvI$ is generated from the second ignition timing advance correcting part 417.

As in the case of the first ignition timing advance correcting part 416, the second ignition timing advance correcting part 417 also includes a map 417M of correcting values as a function of the engine rotational speed N and the load Qa/N, and the ignition timing advance correcting value $\Delta AdvI$ is retrieved from this map 417M. That is, when the throttle valve switch 174 is turned off from its on state, the correcting value $\Delta AdvI$ corresponding to the detected engine rotational speed N and load Qa/N is retrieved from the map 417M, and the signal representing the correcting value $\Delta AdvI$ is generated from the correcting part 417.

The basic value of ignition timing advance Adv and the ignition timing advance correcting values $\Delta AdvT$ and $\Delta AdvI$ are added by adders 419 and 421 to provide the corrected value of ignition timing advance determining the ignition timing, and such an output signal from the arithmetic and logic control unit 410 is applied through the pulse output circuit 126 to the ignition system 430.

Figure 10:
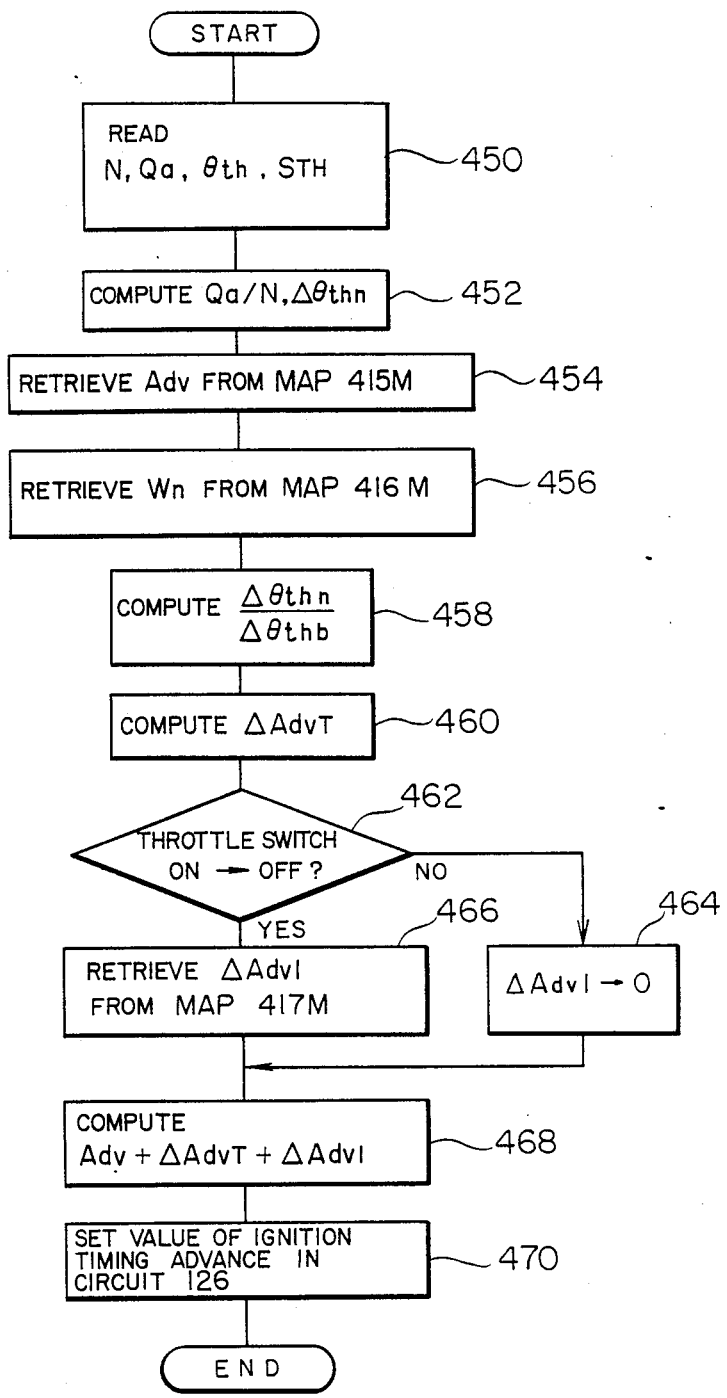
FIG. 10 is a flow chart showing the operation of the second embodiment of the present invention.

The operation of this second embodiment will be described with reference to a flow chart shown in FIG. 10. The flow chart of FIG. 10 is executed at an interval of a predetermined period of time according to a program stored in the ROM 118 shown in FIG. 2. The maps 415M, 416M and 417M are stored in the RAM 116 or ROM 118.

First, in a step 450, the engine rotation speed N is read from the output signals PR and PC of the angular position sensor 98; the quantity of intake air Qa is read from the output signal QA of the air flow meter 14; the throttle valve opening $\theta$th is read from the output signal $\theta$TH of the throttle opening detector 24; and the output signal STH of the throttle valve switch 174 is read. These data are stored in the RAM 116.

In a step 452, the value of Qa/N is computed from the stored values of Qa and N and is stored in the RAM 116. Also, the difference $\Delta\theta$thn = $\theta$thn − $\theta$thn-m between the throttle valve opening $\theta$thn sampled this time and the throttle valve opening $\theta$thn-m sampled at time earlier by m sampling periods than the present time, is computed and stored in the RAM 116. Thus, $\Delta\theta$thn represents the difference between the value of $\theta$th sampled at the present time and that of $\theta$th sampled at time earlier by 10 to 40 msec than the present time.

Then, in a step 454, the basic value of ignition timing advance Adv is retrieved from the map 415M on the basis of the detected values of N and Qa/N obtained in the steps 450 and 452 respectively and is stored in the RAM 116.

In a step 456, the value of the unit correction angle Wn is retrieved from the map 416M on the basis of the detected values of N and Qa/N.

Then, in a step 458, the ratio $$\frac{\Delta\theta thn}{\Delta\theta thb}$$

between the value of $\theta$thb stored previously in the RAM 116 and the value of the $\Delta\theta$thn obtained in the step 452.

In a step 460, the values of Wn and $$\frac{\Delta\theta thn}{\Delta\theta thb}$$

obtained in the respective steps 456 and 458 are multiplied to compute the ignition timing advance correcting value $\Delta$AdvT, and this $\Delta$AdvT is stored in the RAM 116.

In a step 462, check is made as to whether or not a predetermined period of time has not elapsed yet after change-over of the throttle valve 20 from its full closed position to its open position, that is, after change-over of the throttle valve switch 174 from its ON position to its OFF position.

When the result of checking is NO, that is, when the switch 174 remains in its ON position or when the predetermined period of time has elapsed already after change-over of the switch 174 to its OFF position, the step 462 is followed by a step 464 in which the ignition timing advance correcting value $\Delta$AdvI is set at zero or cancelled.

On the other hand, when the result of checking in the step 462 is YES, the step 462 is followed by a step 466 is which the ignition timing advance correcting value $\Delta$AdvI is retrieved from the map 417M on the basis of the detected values of N and Qa/N.

Then, in a step 468, the values of Adv, $\Delta$AdvT and $\Delta$AdvI obtained in the respective steps 454, 460 and 464 or 466 are summed, and, in a step 470, the sum is set in the pulse output circuit 126.

In the second embodiment, the amount of ignition timing advance is corrected in the manner described above when correction is required. Therefore, the responsiveness of the vehicle speed to the accelerator pedal actuation can be improved over the prior art as indicated by the one-dot chain curve in (B) of FIG. 8.

Further, the engine torque can be increased by advancing the ignition timing in response to changeover of the throttle valve switch 174 from its ON position to its OFF position. Therefore, even when the throttle valve opening does not show a remarkable change, the engine torque can be immediately increased to accelerate the vehicle with satisfactory responsiveness regardless of the amount of change in the throttle valve opening, so that the driver is satisfied with the feeling of acceleration.

In the first ignition timing advance correcting part 416, the ignition timing advance correcting value $\Delta$AdvT is computed on the basis of a change $\Delta\theta$thn in the throttle valve opening $\theta$th. It is apparent that $\Delta$AdvT can be computed on the basis of a change $\Delta$Qa in the quantity of intake air Qa. However, the responsiveness of the vehicle speed to the accelerator pedal actuation is somewhat better when $\Delta$AdvT is computed on the basis of $\Delta\theta$thn than when $\Delta$AdvT is computed on the basis of $\Delta$Qa.

This second embodiment is also applicable to the engine control during deceleration, and, in such a case, $\Delta$AdvT is negative.

A third embodiment of the present invention will now be described. The third embodiment is arranged so that, even when the rotational speed of the engine varies due to varations of its load during idling, the rotational speed can be quickly restored to a target rotational speed.

A method of controlling the rotational speed of an engine during idling is described in, for example, "SAE, The Engineering Resource For Advancing Mobility" 840443, (1984), p. 34. As described in the above paper, it is a common practice to feedback the rotational speed of an engine to control an idling speed control valve (ISCV) or a throttle valve so as to attain a target rotation speed. In this case too, a response delay has existed as in the case of acceleration.

Factors greatly affecting the engine rotation speed during idling include a load imposed due to turn-on of an air-conditioner, a load imposed due to actuation of a power steering mechanism and a load imposed due to energization of a cooling fan.

Impartation of such a load or loads during idling of the engine results in a great change in the idling rotational speed of the engine. In the case of the air-conditioner having an exclusive switch for the on-off control thereof, impartation of the air-conditioner load can be detected by detecting the turn-on state of the switch. In the case of any one of the other loads having no exclusive switches, impartation of the load can be detected when a deviation of the engine rotational speed from its target value is larger than a predetermined value.

The third embodiment of the present invention is featured by the fact that, when impartation of a load to the engine during idling is detected, not only the opening of the ISCV but also the quantity of supplied fuel and the amount of ignition timing advance are controlled so that the idling speed of the engine can be quickly restored to its target value.

The third embodiment will now be described with reference to FIGS. 1, 2 and 11 to 16, as it is applied to the engine control system shown in FIGS. 1 and 2.

Figure 11:
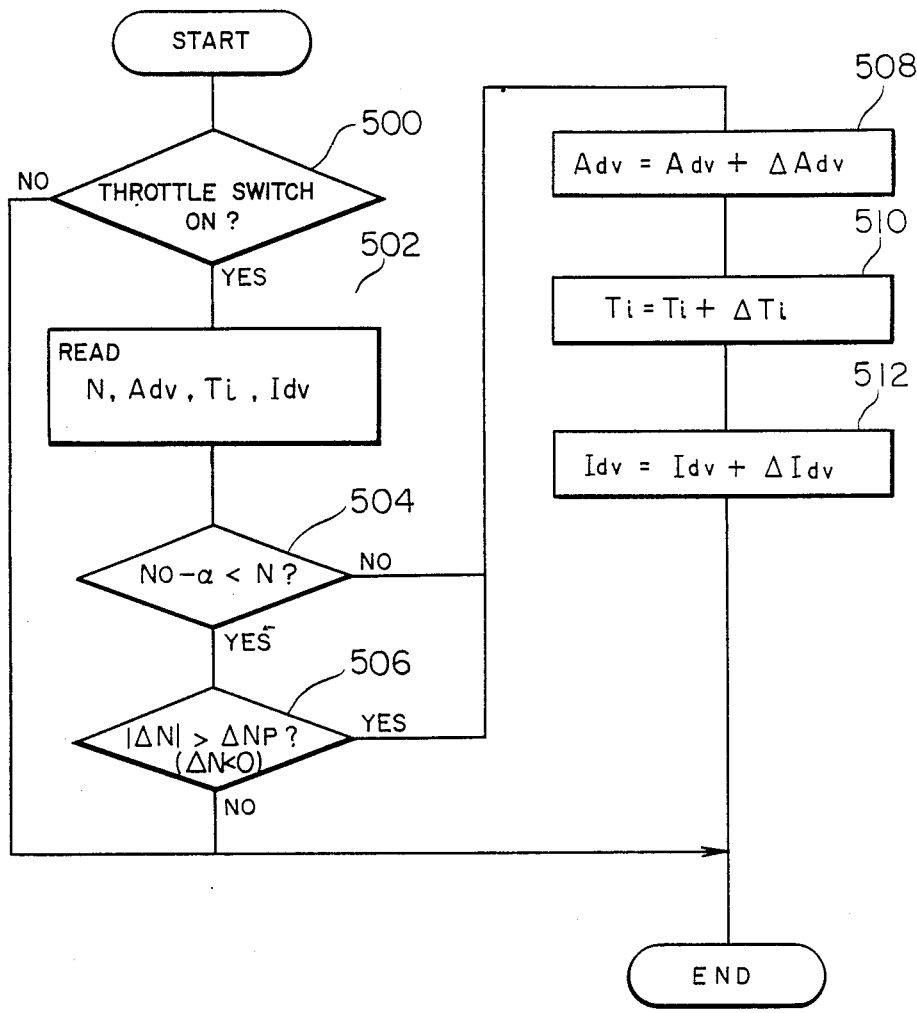
FIG. 11 is a flow chart showing the operation of a third embodiment of the present invention.

FIG. 11 is a flow chart of operation of the third embodiment, and its steps are executed according to a program stored in the ROM 118 shown in FIG. 2. In the flow chart shown in FIG. 11, a variation of the load of the engine is detected by detecting a corresponding variation of the engine rotational speed.

First, in a step 500, whether the throttle valve 20 is in its full-closed position or not is checked on the basis of the output signal $S_{TH}$ of the throttle valve switch 174 which is in its ON position in the full closed position of the throttle valve 20. When the result of checking is NO, the flow comes to its end.

On the other hand, when the result of checking is YES, the step 500 is followed by a step 502. In the step 502, the engine rotation speed N is read from the output signals PR and PC of the angular position sensor 98. Also, the present amount of ignition timing advance Adv computed in the CPU 114, the open duration Ti of the fuel injection valve 66 and the opening Idv of the ISCV are read. These data are stored in the RAM 116.

Figure 12:
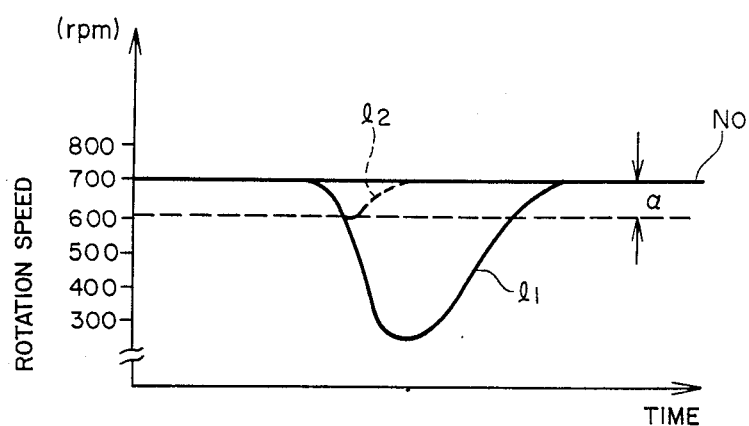
FIG. 12 shows variations of the engine rotational speed during idling.

The step 502 is followed by steps 504 and 506 in which whether or not the engine is operating with an increased load is checked. In the step 504, an increase in the load of the engine is detected when the engine rotational speed N deviates from its target value $N_0$ by an amount larger than a predetermined value $\alpha$ as shown in FIG. 12. In the step 506, an increase in the load of the engine is detected when an amount of change $\Delta N$ in the engine rotational speed N within a predetermined period of time is negative, and its absolute value is larger than a predetermined value $\Delta N_P$.

The solid curve $l_1$ in FIG. 12 illustrates that, according to a prior art engine control, the rotational speed of the engine decreases with the increase in the load of the engine during idling.

According to the present invention, the value of the engine rotational speed N read in the step 502 is compared in the step 504 with the value $(N_0-\alpha)$ previously stored in the RAM 116 to check whether or not the relation $(N_0-\alpha)<N$ holds. When the result of checking is NO, the step 504 is followed by a step 508, while when the result of checking is YES, the step 504 is followed by the step 506.

In the step 506, the difference $\Delta N=N-Nm$ between the engine rotational speed N read in the step 502 and that sampled at time earlier by m sampling periods than the present time is computed and compared with the value $\Delta N_P$ previously stored in the RAM 116 to check whether or not the relations $|\Delta N|>\Delta N_P$ and $\Delta N<0$ hold. The value of $\Delta N_P$ is, for example, 10 to 20 rpm/150 msec. When the result of checking is YES, the step 506 is followed by the step 508, while when the result of checking is NO, the flow comes to its end by deciding that there is no increase in the load.

When an increase in the load of the engine is detected, the amount of ignition timing advance, the period of time of fuel injection (the open duration of the fuel injection valve) and the opening of the ISCV are corrected in steps 508, 510 and 512 respectively.

In the step 508, an ignition timing advance correction value $\Delta Adv$ stored in the RAM 116 is added to the basic value of ignition timing advance Adv employed up to then, and the sum signal is set in the pulse output circuit 126.

In the step 510, a correction value $\Delta Ti$ stored in the RAM 116 is added to the existing value of the open duration Ti of the fuel injection valve (the pulse width of the signal energizing the fuel injection valve), and the sum signal is set in the I/O circuit 130.

In the step 512, a correction value $\Delta Idv$ stored in the RAM 116 is added to the existing value of the opening Idv of the ISCV, and the sum signal is set in the pulse output circuit 126.

The initial value of $\Delta Adv$ corresponds to an angle of 1° to 2°. As shown in (A) of FIG. 13, the ignition timing advance correction value $\Delta Adv$ remains the same as the initial value until combustion occurs several number of times from time $t_1$ and then converges gradually to "0", and the period of time of addition of $\Delta Adv$ to Adv is about 100 msec.

The initial value of $\Delta Ti$ is about 10% of the basic value Ti. As shown in (B) of FIG. 13, the fuel correction value $\Delta Ti$ converges gradually to "0" as the ignition timing advance correction value $\Delta Adv$ converges gradually to "0", and the period of time of addition of $\Delta Ti$ to Ti is about 120 msec.

The maximum value of $\Delta Idv$ is about 10% of the basic value Idv of the ISCV opening. As shown in (C) of FIG. 13, the initial value of $\Delta Idv$ is small, and the value of $\Delta Idv$ increases gradually (continuously or stepwise). The value of $\Delta Idv$ starts to gradually converge to "0" at the point where the value of $\Delta Ti$ converges almost to "0". The period of time of addition of $\Delta Idv$ to Idv is about 5 sec.

Figure 13:
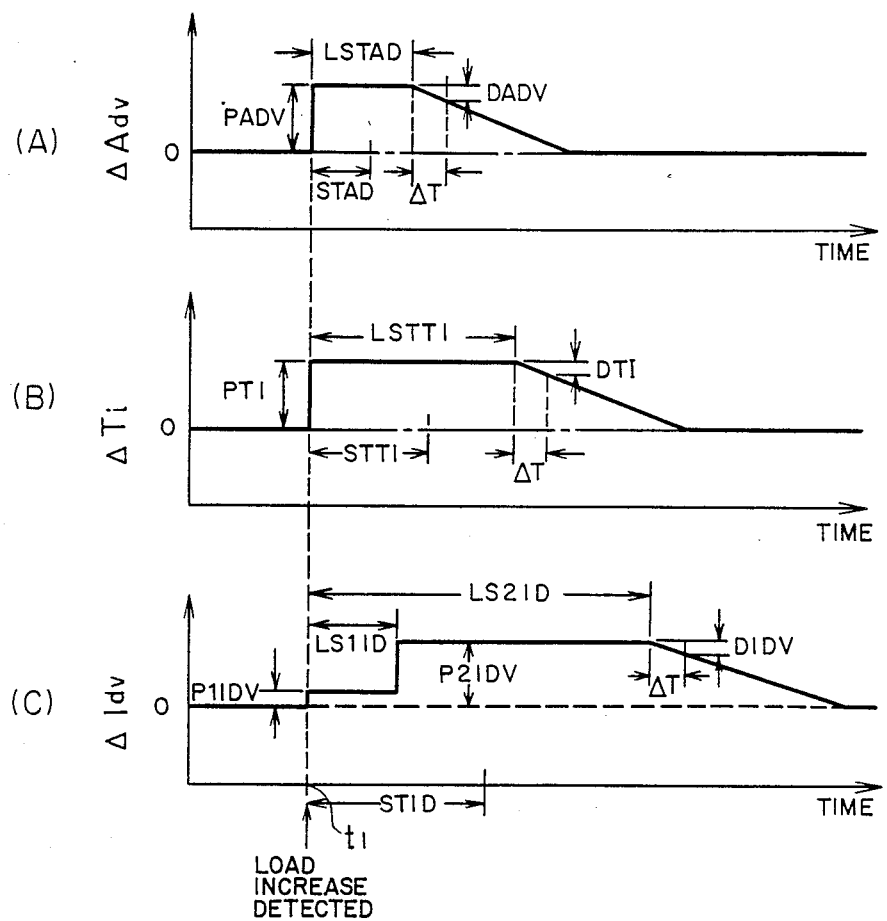
FIG. 13 shows various correction values employed in the third embodiment of the present invention.
Figure 14:
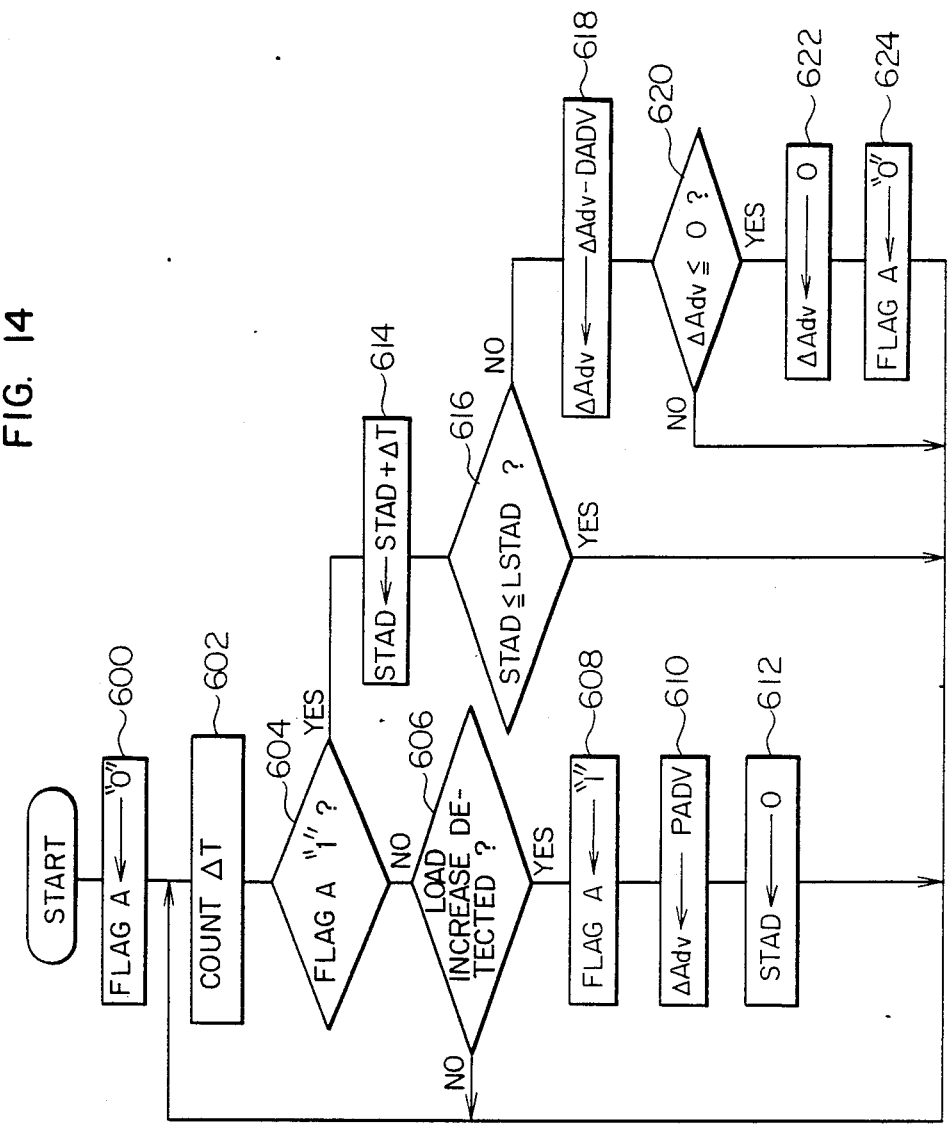
FIGS. 14, 15 and 16 are flow charts showing the operation of the third embodiment for computing the correction values shown in FIG. 13.
Figure 15:
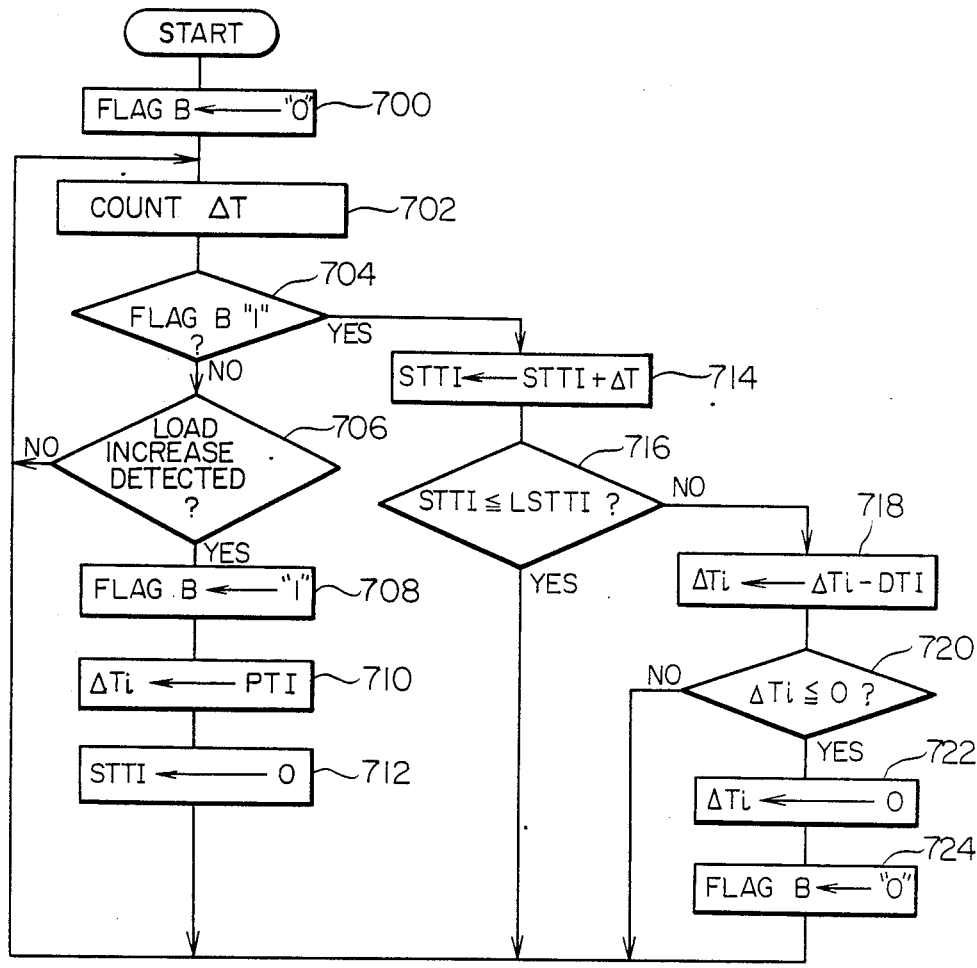
Figure 16:
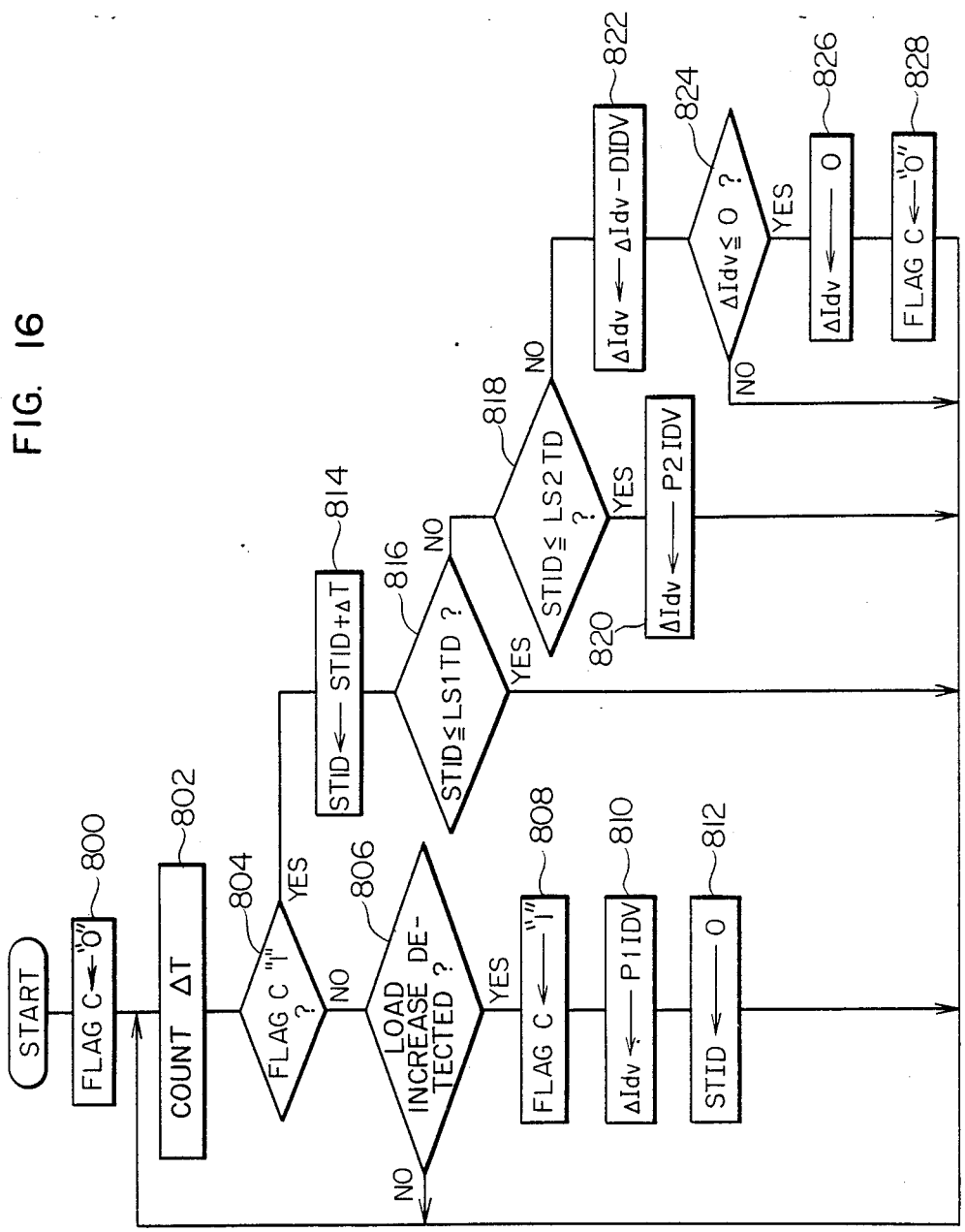

FIGS. 14 to 16 show flow charts for determining the respective correction values $\Delta Adv$, $\Delta Ti$ and $\Delta Idv$ shown in FIG. 13. These flows are executed as independent tasks separately from the flow shown in FIG. 12.

FIG. 14 is a flow chart for determining the correction value $\Delta Adv$.

First, in a step 600, a flag A of "0" is set in a predetermined area of the RAM 116. Thus, a flag A of "0" is initially set in the RAM 116 although a flag A of "1" is set when an increase in the load of the engine is detected.

Then, in a step 602, a predetermined period of time $\Delta T$ is counted, and, after $\Delta T$ has been counted, the step 602 is followed by a step 604.

In the step 604, whether the flag A is "1" or not is checked. When the result of checking is YES, the step 604 is followed by a step 614. However, since the flag A is "0" in this case, the step 604 is followed by a step 606.

In the step 606, whether any increase in the load is detected or not is checked. That is, whether the result of checking in the step 504 of FIG. 11 is NO or the result of checking in the step 506 of FIG. 11 is YES is checked. When the result of checking in the step 606 is NO, the flow returns to the step 602, while when the result of checking is YES, the step 606 is followed by a step 608 in which "1" is set at the position of the flag A.

Then, in a step 610, an initial value PADV is stored in the RAM 116 as the correction value $\Delta Adv$. In a step 612, the data of the period of time STAD elapsed from the time $t_1$ of load increase detection is reset to 0.

When the result of checking in the step 604 is YES, the step 604 is followed by a step 614 in which $\Delta T$ is added to the elapsed time STAD to provide a new value of STAD.

In a step 616, whether the value of STAD obtained in the step 614 is smaller than or equal to a period of time LSTAD of maintaining the initial value PADV is checked, and, when the result of checking in the step 616 is YES, the flow returns to the step 602. Therefore, the correction value $\Delta Adv$ is maintained at its initial value PADV for the period of time LSTAD from the time $t_1$.

On the other hand, when the result of checking in the step 616 proves that STAD>LSTAD, the step 616 is followed by a step 618 in which ($\Delta Adv-DADV$) is selected as a new value of $\Delta Adv$.

Then, in a step 620, whether the value of $\Delta Adv$ is negative or equal to 0 (zero) is checked. If the result of checking is NO because the value of $\Delta Adv$ is positive, the flow returns to the step 602. On the other hand, when the result of checking is YES because the value of $\Delta Adv$ is negative, the step 620 is followed by a step 622 in which $\Delta Adv$ is reset to 0, and the step 622 is followed by a step 624 in which "0" is set at the position of the flag A.

Therefore, the correction value $\Delta Adv$ remains to be the initial value PADV until the period of time LSTAD elapses from the time $t_1$, and DADV is subtracted from the correction value $\Delta$Adv each time $\Delta$T elapses from then.

FIG. 15 is a flow chart for determining the correction value $\Delta$Ti.

First, in a step 700, a flag B of "0" is set in a predetermined area of the RAM 116. Thus, a flag B of "0" is initially set in the RAM 116 although a flag B of "1" is set when an increase in the load of the engine is detected.

Then, in a step 702, a predetermined period of time $\Delta$T is counted, and, after $\Delta$T has been counted, the step 702 is followed by a step 704.

In the step 704, whether the flag B is "1" or not is checked. When the result of checking is YES, the step 704 is followed by a step 714. However, since the flag B is "0" in this case, the step 704 is followed by a step 706.

In the step 706, whether any increase in the load is detected or not is checked. That is, whether the result of checking in the step 504 of FIG. 11 is NO or the result of checking in the step 506 of FIG. 11 is YES is checked. When the result of checking in the step 706 is NO, the flow returns to the step 702, while when the result of checking is YES, the step 706 is followed by a step 708 in which "1" is set at the position of the flag B.

Then, in a step 710, an initial value PTI is stored in the RAM 116 as the correction value $\Delta$Ti. In a step 712, the data of the period of time STTI elapsed from the time $t_1$ of load increase detection is reset to 0.

When the result of checking in the step 704 is YES, the step 704 is followed by a step 714 in which $\Delta$T is added to the elapsed time STTI to provide a new value of STTI.

In a step 716, whether the value of STTI obtained in the step 714 is smaller than or equal to a period of time LSTTI of maintaining the initial value PTI is checked, and, when the result of checking in the step 716 if YES, the flow returns to the step 702. Therefore, the correction value $\Delta$Ti is maintained at its initial value PTI for the period of time LSTTI from the time $t_1$.

On the other hand, when the result of checking in the step 716 proves that STTI>LSTTI, the step 716 is followed by a step 718 in which ($\Delta$Ti−DTI) is selected as a new value of $\Delta$Ti.

Then, in a step 720, whether the value of $\Delta$Ti is negative or equal to 0 (zero) is checked. If the result of checking is NO because the value of $\Delta$Ti is positive, the flow returns to the step 702. On the other hand, when the result of checking is YES because the value of $\Delta$Ti is negative, the step 720 is followed by a step 722 in which $\Delta$Ti is reset to 0, and the step 722 is followed by a step 724 in which "0" is set at the position of the flag B.

Therefore, the correction value $\Delta$Ti remains to be the initial value PTI until the period of time LSTTI elapses from the time $t_1$, and DTI is subtracted from the correction value $\Delta$Ti each time $\Delta$T elapses from then.

FIG. 16 is a flow chart for determining the correction value $\Delta$Idv.

First, in a step 800, a flag C of "0" is set in a predetermined area of the RAM 116. Thus, a flag C of "0" is initially set in the RAM 116 although a flag C of "1" is set when an increase in the load of the engine is detected.

Then, in a step 802, a predetermined period of time $\Delta$T is counted, and, after $\Delta$T has been counted, the step 802 is followed by a step 804.

In the step 804, whether the flag C is "1" or not is checked. When the result of checking is YES, the step 804 is followed by a step 814. However, since the flag C is "0" in this case, the step 804 is followed by a step 806.

In the step 806, whether any increase in the load is detected or not is checked. That is, whether the result of checking in the step 504 of FIG. 11 is NO or the result of checking in the step 506 of FIG. 11 is YES is checked. When the result of checking in the step 806 is NO, the flow returns to the step 802, while when the result of checking is YES, the step 806 is followed by a step 808 in which "1" is set at the position of the flag C.

Then, in a step 810, an initial value P1IDV is stored in the RAM 116 as the correction value $\Delta$Idv. In a step 812, the data of the period of time STID elapsed from the time $t_1$ of load increase detection is reset to 0.

When the result of checking in the step 804 is YES, the step 804 is followed by a step 814 in which $\Delta$T is added to the elapsed time STID to provide a new value of STID.

In a step 816, whether the value of STID obtained in the step 814 is smaller than or equal to a period of time LS1ID of maintaining the initial value P1IDV is checked, and, when the result of checking in the step 816 is YES, the flow returns to the step 802. Therefore, the correction value $\Delta$Idv is maintained at the initial value P1IDV for the period of time LS1ID from the time $t_1$.

On the other hand, when the result of checking in the step 816 proves that STID>LS1ID, the step 816 is followed by a step 818 in which whether the elapsed period of time STID is shorter than or equal to a predetermined period of time LS2ID is checked. When the result of checking is YES, the step 818 is followed by a step 820 in which P2IDV is set in the RAM 116 as the correction value $\Delta$Idv, and the flow returns to the step 802.

On the other hand, when the result of checking in the step 818 proves that STID>LS2ID, the step 818 is followed by a step 822 in which ($\Delta$Idv−DIDV) is selected as a new value of $\Delta$Idv.

Then, in a step 824, whether the value of Idv is negative or equal to 0 (zero) is checked. If the result of checking is NO because the value of $\Delta$Idv is positive, the flow returns to the step 802. On the other hand, when the result of checking is YES because the value of $\Delta$Idv is negative, the step 824 is followed by a step 826 in which $\Delta$Idv is reset to 0, and the step 826 is followed by a step 828 in which "0" is set at the position of the flag C.

Therefore, the correction value $\Delta$Idv remains to be the initial value P1IDV until the period of time LS1ID elapses from the time $t_1$, and, thereafter, the correction value increases to its maximum P2IDV and remains in that value until a period of time LS2ID elapses from the time $t_1$. After lapse of the period of time LS2ID, DIDV is subtracted from the correction value $\Delta$Idv each time $\Delta$T elapses from then. The initial value P1IDV may be 0 (zero).

Computation in the steps 508, 510 and 512 of FIG. 11 is carried out using the correction values $\Delta$Adv, $\Delta$Ti and $\Delta$Idv determined in the manner described above.

An increase in the load due to turn-on of, for example, the air-conditioner may be identified in the step 502 by detecting appearance of the output signal of the air-conditioner switch 176. In such a case, the steps 504 and 506 can be eliminated.

According to the third embodiment of the present invention, the idling rotational speed of the engine is prevented from a great drop due to a sudden increase in the load and can be quickly restored to its target value $N_0$ as shown by the dotted curve $l_2$ in FIG. 12.

When a torque sensor capable of sensing a drop of the engine rotational speed or a pressure sensor sensing the internal pressure of the cylinder is provided in the engine control system as a means for detecting an increase in the load instead of measurement of the engine rotational speed or its rate of change, the increase in the load can be detected by measuring a change in the torque or a change in the internal pressure of the cylinders. Thus, by the provision of such a sensor, the engine control as described above can also be reliably attained.

In the third embodiment, the engine control is based on noting a drop of the engine rotation speed. However, a similar idea can be applied to a decrease in the load. Thus, by detecting a minus change in the load, various correction values of negative polarities contrary to the positive correction values may be used to maintain the desired idling rotational speed of the engine.

In the third embodiment of the present invention described above, the quantity of intake air is controlled by the ISCV for the control of the idling rotational speed of the engine. However, when the engine control system is of a type in which the throttle valve is not mechanically connected to the accelerator pedal but is electrically connected to the acclerator pedal by means such as a servomotor, the quantity of intake air can be regulated by the throttle valve and, therefore, the throttle valve may be used for the control in lieu of the ISCV.

According to the third embodiment, the output signal from, for example, the air-conditioner switch or rotational speed sensor is utilized to detect an increase or a decrease in the load of the engine at the time of controlling the idling speed of the engine, thereby correcting the quantity of injected fuel or the opening of the ISCV or throttle valve. Therefore, an undesirable drop of the idling speed of the engine can be prevented to ensure rotation of the engine at its stable speed, and the fear of so-called engine stalling can be reduced to a minimum. Further, although the target value of the engine rotational speed during idling has been selected to be slightly higher than its proper value in order to prevent stalling of the engine, the target value can be considerably lowered from the prior art setting according to the present invention, and fuel consumption can be correspondingly decreased.

In the case of correction of various factors for the engine control, such as correction of the ignition timing, the quantity of injected fuel, the opening of the ISCV and the opening of the throttle valve, a torque change due to correction of the ignition timing appears earliest of all, but a torque change due to correction of the quantity of injected fuel appears latest of all. This is because the flow of air reaches the cylinders earlier than the flow of fuel, and particles of fuel tend to deposit on the inner wall surface of the intake manifold. Therefore, when both the quantity of intake air and the quantity of fuel are simultaneously increased at the time of acceleration, a lean air-fuel ratio results in a hesitation of acceleration. Therefore, as shown in FIG. 13, it is desirable from the aspects of air-fuel ratio control and the torque control to increase the quantity of fuel earlier than increasing the quantity of air when the load is increased.

We claim:

1. A system for electronically controlling an internal combustion engine for a vehicle comprising:
    first detecting means for detecting an amount of depression of an accelerator pedal;
    second detecting means for detecting an actual acceleration of the vehicle with respect to the road surface;
    actuator means for controlling an amount of opening a throttle valve;
    target acceleration setting means for setting respective values of target acceleration of the vehicle according to respective values of accelerator pedal depression detected by said first detecting means;
    means for determining an error between the acceleration of the vehicle detected by said second detecting means and the target acceleration set by said target acceleration setting means; and
    computing means for computing a target value of the opening of the throttle valve on the basis of said acceleration error and for applying a signal representing the computed target value of the throttle valve opening to said actuator means.

2. A system for electronically controlling an internal combustion engine for a vehicle comprising:
    first detecting means for detecting an amount of depression of an accelerator pedal;
    second detecting means for detecting an acceleration of the vehicle;
    actuator means for controlling an amount of opening a throttle valve;
    target acceleration setting means for setting a target acceleration of the vehicle according to the amount of accelerator pedal depression detected by said first detecting means;
    means for determining an error between the acceleration of the vehicle detected by said second detecting means and the target acceleration set by said target acceleration setting means; and
    computing means for computing a target value of the opening of the throttle valve on the basis of said acceleration error and applying a signal representing the computed target value of the throttle valve opening to said actuator means;
    wherein said target acceleration setting means determines said target acceleration by estimating the load of the engine, multiplying said detected amount of accelerator pedal depression by a predetermined coefficient to compute a drive force of the engine desired by the driver, and subtracting said estimated engine load from said computed drive force.

3. A system for electronically controlling an internal combustion engine for a vehicle comprising:
    first detecting means for detecting an amount of depression of an accelerator pedal;
    second detecting means for detecting an acceleration of the vehicle;
    actuator means for controlling an amount of opening a throttle valve;
    target acceleration setting means for setting a target acceleration of the vehicle according to the amount of accelerator pedal depression detected by said first detecting means;
    means for determining an error between the acceleration of the vehicle detected by said second detecting means and the target acceleration set by said target acceleration setting means; and computing means for computing a target value of the opening of the throttle valve on the basis of said acceleration error and applying a signal representing the computed target value of the throttle valve opening to said actuator means;
wherein said computing means includes a phase lead element and a phase lag element for carrying out serial phase-lead and phase-lag compensation for said acceleration error.

4. An electronic engine control system according to claim 3, wherein said phase lead element has a transfer function given by $$\frac{\alpha(1 + T_L S)}{1 + \alpha T_L S},$$

where $0 < \alpha < 1$, and the phase of its output signal is advanced relative to that of its input signal at a frequency in the vicinity of $$\frac{1}{T_L \sqrt{\alpha}},$$

where $T_L$ is a period of time required until acceleration attains a predetermined percentage of target acceleration.

5. An electronic engine control system according to claim 3, wherein said phase lag element has a transfer function given by $$\frac{1 + T_D S}{1 + \beta T_D S},$$

where the value of $\beta$ is determined so that $1/\beta$ of said acceleration error lies within a range of required accuracy, and the value of $T_D$ is determined so that the product obtained by multiplying an accelerating surge frequency of the vehicle by $T_D$ is 1 (unity).

6. An electronic engine control system according to claim 3, wherein said computing means further includes a gain adjusting element for adjusting the gain of serial compensation.

7. A method of electronically controlling an internal combustion engine for a vehicle having first detecting means for detecting an amount of depression of an accelerator pedal, second detecting means for detecting an actual acceleration of the vehicle with respect to the road surface and actuator means for controlling an amount of opening of a throttle valve, said method comprising:
a first step of setting respective values of target acceleration of the vehicle according to respective values of accelerator pedal depression detected by said first detecting means;
a second step of determining an error between the acceleration of the vehicle detected by said second detecting means and the target acceleration set by said first step;
a third step of computing a target value of the opening of the throttle valve on the basis of said acceleration error; and
a fourth step of applying a signal representing the computed target value of the throttle valve opening to said actuator means.

8. A method of electronically controlling an internal combustion engine for a vehicle having first detecting means for detecting an amount of depression of an accelerator pedal, second detecting means for detecting an acceleration of the vehicle and actuator means for controlling an amount of opening of a throttle valve, said method comprising:
a first step of setting a target acceleration of the vehicle according to the amount of accelerator pedal depression detected by said first detecting means;
a second step of determining an error between the acceleration of the vehicle detected by said second detecting means and the target acceleration set by said first step;
a third step of computing a target value of the opening of the throttle valve on the basis of said acceleration error; and
a fourth step of applying a signal representing the computed target value of the throttle valve opening to said actuator means;
wherein said second step determines said target acceleration by estimating the load of the engine, multiplying said detected amount of accelerator pedal depression by a predetermined coefficient to compute a drive force of the engine desired by the driver, and subtracting said estimated engine load from said computed drive force.

9. A method of electronically controlling an internal combustion engine for a vehicle having first detecting means for detecting an amount of depression of an accelerator pedal, second detecting means for detecting an acceleration of the vehicle and actuator means for controlling an amount of opening of a throttle valve, said method comprising:
a first step of setting a target acceleration of the vehicle according to the amount of accelerator pedal depression detected by said first detecting means;
a second step of determining an error between the acceleration of the vehicle detected by said second detecting means and the target acceleration set by said first step;
a third step of computing a target value of the opening of the throttle valve on the basis of said acceleration error; and
a fourth step of applying a signal representing the computed target value of the throttle valve opening to said actuator means;
wherein said third step carries out serial phase-lead and phase-lad compensation for said acceleration error by computing means including a phase-lead element and a phase-lag element.

10. An electronic engine control method according to claim 9, wherein said phase-lag element has a transfer function given by $$\frac{\alpha(1 + T_L S)}{1 + \alpha T_L S},$$

where $0 < \alpha < 1$, and the phase of its output signal is advanced relative to that of its input signal at a frequency in the vicinity of $$\frac{1}{T_L \sqrt{\alpha}},$$

where $T_L$ is a period of time required until acceleration attains a predetermined percentage of target acceleration.

11. An electronic engine control method according to claim 9, wherein said phase-lag element has a transfer function given $$\frac{1 + T_D S}{1 + \beta T_D S},$$

where the value of $\beta$ is determined so that $1/\beta$ of said acceleration error lies within a range of required accuracy, and the value of $T_D$ is determined so that the product obtained by multiplying an accelerating surge frequency of the vehicle by $T_D$ is 1 (unity).

12. An electronic engine control method according to claim 9, wherein said computing means further includes a gain adjusting element for adjusting the gain of serial compensation.

13. A system for electronically controlling an internal combustion engine for a vehicle comprising:
   first detecting means for detecting a load of the engine;
   second detecting means for detecting a value corresponding to an amount of depression of an accelerator pedal;
   means for computing a rate of change of the value corresponding to the amount of accelerator pedal depression detected by said second detecting means;
   an ignition system applying an ignition signal to the engine;
   means for computing a basic value of ignition timing advance on the basis of the engine load detected by said first detecting means;
   means for computing a first correction value of ignition timing advance on the basis of said computed change rate of the accelerator pedal depression and said detected engine load;
   means for adding said first correction value of ignition timing advance to said basic value of ignition timing advance; and
   means for applying a signal representing the result of addition by said adding means to said ignition system to produce said ignition signal with the ignition timing advance corresponding to the result of addition.

14. An electronic engine control system according to claim 13, wherein said value corresponding to the amount of accelerator pedal depression is represented by an amount of opening of the throttle valve, and said engine load is represented by the rotational speed of the engine and the quantity of intake air supplied per revolution of the engine.

15. An electronic engine control system according to claim 13, further comprising:
   third detecting means for detecting whether the throttle valve is in its full-closed position or not; and
   means for computing a second correction value of ignition timing advance on the basis of the engine load detected by said first detecting means, when said third detecting means detects that the throttle valve has been opened from its full-closed position,
   said adding means applying a signal representing the sum of said basic value and said first and second correction values of ignition timing advance to said ignition system.

16. A method of electronically controlling an internal combustion engine for a vehicle having first detecting means for detecting a load of the engine, second detecting means for detecting a value corresponding to an amount of depression of an accelerator pedal; and
   an ignition system applying an ignition signal to the engine, said method comprising:
   a first step of computing a rate of change of the value corresponding to the amount of accelerator pedal depression detected by said second detecting means;
   a second step of computing a basic value of ignition timing advance on the basis of the engine load detected by said first detecting means;
   a third step of computing a first correction value of ignition timing advance on the basis of said computed change rate of the accelerator pedal depression and said detected engine load;
   a fourth step of adding said first correction value of ignition timing advance to said basic value of ignition timing advance; and
   a fifth step of applying a signal representing the result of addition by said adding means to said ignition system to ignite the engine with the ignition timing advance corresponding to the result of addition.

17. An electronic engine control method according to claim 16, wherein said value corresponding to the amount of accelerator pedal depression is represented by an amount of opening of the throttle valve, and said engine load is represented by the rotational speed of the engine and the quantity of intake air supplied per revolution of the engine.

18. An electronic engine control method according to claim 16, wherein said engine is further provided with third detecting means for detecting whether the throttle valve is in its full-closed position or not, and said method further comprises a sixth step of computing a second correction value of ignition timing advance on the basis of the engine load detected by said first detecting means, when said third detecting means detects that the throttle valve has been opened from its full-closed position, said fourth step applying a signal representing the sum of said basic value and said first and second correction values of ignition timing advance to said ignition system.

19. A system for electronically controlling an internal combustion engine for a vehicle comprising:
   first detecting means for detecting operating conditions of the engine;
   second detecting means for detecting a load of the engine;
   third detecting means for detecting an idling state of the engine;
   igniting means for applying an ignition signal to the engine;
   fuel supply control means for controlling flow of fuel supplied to the engine;
   valve means for controlling flow of intake air supplied to the engine; and
   computing means for computing an amount of ignition timing advance, a quantity of fuel to be supplied and an amount of opening of said valve means in response to output signals from said first, second and third detecting means and applying signals representing the computed variables to said igniting means, said fuel supply control means and said valve means respectively, said computing means normally generating signals representing a basic value of said ignition timing advance, a basic value of said quantity of fuel to be supplied and a basic value of said valve opening when said third detecting means detects that the engine is idling without any change in its load, but said computing means generating signals representing corrected basic values of said variables respectively when said second detecting means detects a change in the load of the engine.

20. An electronic engine control system according to claim 19, wherein said second detecting means detects the rotation speed of the engine and detects a change in the load of the engine by detecting a change in the rotation speed of the engine.

21. An electronic engine control system according to claim 19, wherein said second detecting means detects whether an air-conditioner is operating or not.

22. An electronic engine control system according to claim 19, wherein, when an increase in the load of the engine is detected while the engine is idling, said computing means generates signals representing the sums of correction values and basic values of said ignition timing advance, said quantity of fuel to be supplied and said valve opening respectively.

23. An electronic engine control system according to claim 22, wherein, prior to generation of the signal representing the sum of the correction value and the basic value of said quantity of fuel to be supplied, said computing means generates the signals representing the sums of the correction values and the basic values of said ignition timing advance and said valve opening respectively.

24. An electronic engine control system according to claim 23, wherein each of said correction values is initially constant but starts to gradually decrease after a predetermined period of time.

25. An electronic engine control system according to claim 19, wherein said valve means includes a bypass valve located in a bypass passage disposed in parallel to an intake air passage having a throttle valve therein, so as to control the quantity of air flowing through said bypass passage.

26. A method of electronically controlling an internal combustion engine for a vehicle having first detecting means for detecting operating conditions of the engine, second detecting means for detecting a load of the engine, third detecting means for detecting an idling state of the engine, igniting means for applying an ignition signal to the engine, fuel supply control means for controlling flow of fuel supplied to the engine, valve means for controlling flow of intake air supplied to the engine, and computing means for computing an amount of ignition timing advance, a quantity of fuel to be supplied and an amount of opening of said valve means in response to output signals from said first, second and third detecting means and applying signals representing the computed variables to said igniting means, said fuel supply control means and said valve means respectively, said method comprising:

a first step of detecting whether the engine is idling or not;

a second step of detecting whether the load of the engine has changed or not;

a third step of computing a basic value of said ignition timing advance, a basic value of said quantity of fuel to be supplied and a basic value of said valve opening when the idling of the engine is detected in said first step; and a fourth step of correcting the basic values computed in said third step, when a change in the engine load is detected in said second step, and applying signals representing the corrected basic values to said igniting means, said fuel supply control means and said valve means respectively.

27. An electronic engine control method according to claim 26, wherein said second step detects the rotational speed of the engine and detects a change in the load of the engine by detecting a change in the rotational speed of the engine.

28. An electronic engine control method according to claim 26, wherein said second step detects whether an air-conditioner is operating or not.

29. An electronic engine control method according to claim 26, wherein, when an increase in the load of the engine is detected while the engine is idling, said computing means generates signals representing the sums of correction values and basic values of said ignition timing advance, said quantity of fuel to be supplied and said valve opening respectively in said fourth step.

30. An electronic engine control method according to claim 29, wherein, prior to generation of the signal representing the sum of the correction value and the basic value of said quantity of fuel to be supplied, said computing means generates the signals representing the sums of the correction values and the basic values of said ignition timing advance and said valve opening respectively in said fourth step.

31. An electronic engine control method according to claim 30, wherein each of said correction values is initially constant but starts to gradually decrease after a predetermined period of time.

32. An electronic engine control method according to claim 26, wherein said valve means includes a bypass valve located in a bypass passage disposed in parallel to an intake air passage having a throttle valve therein, so as to control the quantity of air flowing through said bypass passage.

* * * * *